(12) United States Patent
Gee et al.

(10) Patent No.: US 10,042,094 B2
(45) Date of Patent: Aug. 7, 2018

(54) WEATHERABLE SOLAR REFLECTOR WITH HIGH ABRASION RESISTANCE

(75) Inventors: Randy Gee, Arvada, CO (US); Mike Digrazia, Longmont, CO (US); Gary Jorgensen, Pine, CO (US)

(73) Assignees: SkyFuel, Inc., Lakewood, CO (US); Alliance For Sustainable Energy, LLC, Golden, CO (US)

( * ) Notice: Subject to any disclaimer, the term of this patent is extended or adjusted under 35 U.S.C. 154(b) by 1159 days.

(21) Appl. No.: 14/342,731

(22) PCT Filed: Sep. 6, 2011

(86) PCT No.: PCT/US2011/050542
§ 371 (c)(1),
(2), (4) Date: Aug. 19, 2014

(87) PCT Pub. No.: WO2013/036220
PCT Pub. Date: Mar. 14, 2013

(65) Prior Publication Data
US 2014/0352685 A1    Dec. 4, 2014

(51) Int. Cl.
| F24J 2/46 | (2006.01) |
| G02B 5/08 | (2006.01) |
| G02B 1/14 | (2015.01) |
| G02B 1/10 | (2015.01) |
| G02B 19/00 | (2006.01) |
| B32B 7/12 | (2006.01) |

(Continued)

(52) U.S. Cl.
CPC ............. *G02B 5/0808* (2013.01); *B32B 7/12* (2013.01); *B32B 15/09* (2013.01); *B32B 15/20* (2013.01); *F24J 2/46* (2013.01); *G02B 1/105* (2013.01); *G02B 1/14* (2015.01); *G02B 19/0019* (2013.01); *G02B 19/0042* (2013.01); *B32B 2255/10* (2013.01); *B32B 2307/416* (2013.01); *B32B 2307/584* (2013.01); *B32B 2307/71* (2013.01)

(58) Field of Classification Search
USPC .................................. 126/714; 359/361, 838
See application file for complete search history.

(56) References Cited

U.S. PATENT DOCUMENTS

| 2,955,955 A | 10/1960 | Orr |
| 3,775,226 A | 11/1973 | Windorf |

(Continued)

FOREIGN PATENT DOCUMENTS

| CN | 101365968 A | 2/2009 |
| WO | WO 2007/076282 | 7/2007 |

OTHER PUBLICATIONS

3M Renewable Energy Division. (Jan. 2012) "3M Solar Mirror Film 1100," St. Paul, MN.

(Continued)

*Primary Examiner* — Avinash Savani
(74) *Attorney, Agent, or Firm* — Leydig, Voit & Mayer, Ltd.

(57) ABSTRACT

Described herein are solar reflectors which provide a low cost reflector construction that has a unique set of attributes: high solar reflectance, abrasion resistance, UV stability, mechanical integrity, and flexibility. The abrasion resistance is enabled through incorporation of an abrasion-resistant coating into a polymer film metal mirror construction. Methods of using the solar reflectors in solar concentrating applications are also provided.

35 Claims, 17 Drawing Sheets

(51) Int. Cl.
B32B 15/09 (2006.01)
B32B 15/20 (2006.01)

(56) References Cited

U.S. PATENT DOCUMENTS

| | | | |
|---|---|---|---|
| 4,226,910 A | 10/1980 | Dahlen et al. | |
| 4,230,763 A | 10/1980 | Skolnick | |
| 4,307,150 A | 12/1981 | Roche | |
| 4,414,254 A | 11/1983 | Iwata et al. | |
| 4,446,262 A | 5/1984 | Okumura et al. | |
| 4,493,872 A | 1/1985 | Fundernurk et al. | |
| 4,645,714 A | 2/1987 | Roche et al. | |
| 4,666,263 A | 5/1987 | Petcavich | |
| 4,710,426 A * | 12/1987 | Stephens | C03C 17/38 359/360 |
| 4,853,283 A | 8/1989 | Skolnick | |
| 4,933,823 A | 6/1990 | Taylor | |
| 5,063,112 A | 11/1991 | Gross et al. | |
| 5,069,964 A | 12/1991 | Tolliver et al. | |
| 5,118,540 A | 6/1992 | Hutchison | |
| 5,251,064 A | 10/1993 | Tennant et al. | |
| 5,276,600 A | 1/1994 | Takase et al. | |
| 5,361,172 A | 11/1994 | Schissel et al. | |
| 5,681,642 A | 10/1997 | Sugisaki et al. | |
| 5,846,659 A | 12/1998 | Löwer et al. | |
| 6,989,924 B1 | 1/2006 | Jorgensen et al. | |
| 7,612,937 B2 | 11/2009 | Jorgensen et al. | |
| 2006/0181765 A1 | 8/2006 | Jorgensen et al. | |
| 2009/0283133 A1* | 11/2009 | Hebrink | G02B 1/105 136/246 |
| 2012/0011850 A1* | 1/2012 | Hebrink | F24J 2/07 60/641.15 |

OTHER PUBLICATIONS

DiGrazia et al. (2009), "ReflecTech® Mirror Film Attributes and Durability for CSP Applications", ASME Conference, Proceedings of Energy Sustainability 2009, Jul. 19-23, 2009, San Francisco, California.
DiGrazia et al. (2011), "Reflectech® Polymer Mirror Film Advancements in Technology and Durability Testing", Proceedings of ASME 2011 5th International Conference on Energy Sustainability & 9th Fuel Cell Science, Engineering and Technology Conference, ESFuelCell2011-54152, Aug. 7-10, 2011, Washington, DC, USA.
Hardcastle et al. (2009), "Ultra-Accelerated Weathering System I: Design and Functional Considerations", Material Testing Product and Technology News 40(8):1-15, Fall 2010.
International Search Report and Written Opinion dated Jan. 24, 2012, corresponding to International Patent Application No. PCT/US11/50542, 13 pages.
International Preliminary Report on Patentability dated Mar. 12, 2014, corresponding to International Patent Application No. PCT/US11/50542, 8 pages.
Jorgensen et al. (1994), "Advanced Reflector Materials for Solar Concentrators," NREL/TP-471-7018 • UC Category: 1233, Prepared for the 7th International Symposium on Solar Thermal Concentrating Technologies, Moscow, Russia, Sep. 26-30, 1994.
Jorgensen et al. (2010), "Development and Testing of Abrasion Resistant Hard Coats for Polymer Film Reflectors", SolarPACES 2010, Perpignan, France, Sep. 21-24, 2010.
Kennedy et al.(2005), "Optical Durability of Candidate Solar Reflectors," Transactions of the ASME, vol. 127, May 2005, pp. 262-269.
Moulds (1999), "Hardcoats in the World of the Vacuum Coater", 42nd Annual Technical Conference Proceedings, Society of Vacuum Coaters, Chicago, Illinois, Apr. 17-22, 1999, pp. 442-444.
First Office Action dated Dec. 11, 2014, corresponding to Chinese Patent Application No. 2011800746558 (English translation).
Second Office Action dated Oct. 19, 2015, corresponding to Chinese Patent Application No. 2011800746558 (English translation).
Third Office Action dated Apr. 6, 2016, corresponding to Chinese Patent Application No. 2011800746558 (English translation).
Decision of Rejection dated Aug. 4, 2016, corresponding to Chinese Patent Application No. 2011800746558 (including English translation).
Notification of Reexamination dated Apr. 7, 2017, corresponding to Chinese Patent Application No. 201180074655.8 (including English translation).
Reexamination Decision dated Sep. 27, 2017, for Chinese Patent Application No. 201180074655.8 (including English translation).
Wang et al. (Apr. 2005), *Acrylate Paint*, Chemical Industry Press, the Publishing Center of Material Science and Engineering, the first edition, p. 381.

* cited by examiner

| HARDCOAT (4 to 6 microns) |
| --- |
| $SiO_x$ or $Al_2O_3$ |
| POLYMER FILM (PET or PC) |
| SILVER LAYER (~ 800 angstroms) |
| PRESSURE SENSITIVE ADHESIVE |

Figure 12

WEATHERABLE SOLAR REFLECTOR WITH HIGH ABRASION RESISTANCE

STATEMENT REGARDING FEDERALLY SPONSORED RESEARCH OR DEVELOPMENT

The United States Government has rights in this invention pursuant to Contract No. DE-AC36-99-GO10337 between the United States Department of Energy and the National Renewable Energy Laboratory.

CROSS-REFERENCE TO RELATED APPLICATIONS

This application is a U.S. National Stage Application under 35 U.S.C. § 371 of International Application No. PCT/US2011/050542, filed Sep. 6, 2011, which is hereby incorporated by reference in its entirety.

BACKGROUND

Insufficient weather protection and ultraviolet degradation are problems encountered when using solar reflectors made of a flexible specular silver mirror. When used outdoors, these mirrors must be durable and ultraviolet light (UV) resistant in order to retain their dimensional stability, aesthetic appearance, and specular-reflectance in the visible, ultraviolet, and near infrared wavelengths.

Specular-reflectance is provided in a flexible silver mirror through a silvered composite lamina, having a thin layer of silver vacuum-deposited on the surface of a flexible polymer substrate. Silver is used in some applications because its reflectivity is substantially higher than that of other metals, such as aluminum. To retain specular reflectance over time, some have focused on the application of advanced adhesives and protective layers, coated over the polymer substrate and silver layer, to protect the mirrors from abrasion, weathering, and ultraviolet degradation.

Early techniques used to protect solar mirrors from abrasion, weathering, and ultraviolet degradation were developed with aluminum mirrors. For example, in U.S. Pat. No. 4,307,150, a solar reflector is disclosed wherein an opaque aluminum surface, vacuum-deposited on a flexible polyester support-sheet, is protected from corrosion and weathering with an inter-polymer layer of acrylate or methacrylate copolymers. The support sheet consists of a biaxially oriented polyethylene terephthalate lamina having conventional slip agents, to facilitate winding, and a second polyethylene terephthalate lamina which contains no slip agent.

Silver is higher in specular reflection than aluminum. Thus, the assumption had been to substitute silver for aluminum in the solar reflector described above. However, this approach has been reported, in U.S. Pat. No. 4,645,714, to result in two undesirable phenomena. First, silver is susceptible to corrosion either through the development of pin holes in the acrylate coating or along peripheral portions of the silver-coated film. Second, a thin layer of silver, unlike a thin layer of aluminum, has a spectral window through which ultraviolet ("UV") light readily passes. A peak transmission of this light is at 320 nm, and sunlight contains ultraviolet light in this wavelength. The transmission of ultraviolet light through the silver layer degrades the underlying polyester substrate causing bubbles in the adhesives, commonly used to adhere the substrate to a rigid support. This degradation and bubbling reduces the aesthetic and specular functional properties of the solar mirror.

Corrosion inhibitors and UV absorbers, incorporated into the adhesives or protective film coatings overlaying a polyester and silver mirror substrate, have been used to retain these functional properties. However, while corrosion inhibitors can reduce corrosion, they can impart an unacceptable color to the mirror, over time, and do not block the ultraviolet light. In contrast, when ultraviolet light absorbers are incorporated into a protective polymer overlay, the rate of polyester support degradation is lessened, but silver corrosion is aggravated. Thus, attempts have been made to isolate the corrosion inhibitor and ultraviolet absorber elements from the mirror's reactive components in order to eliminate these undesirable effects.

In U.S. Pat. No. 4,645,714, a corrosion resistant silver mirror is disclosed wherein a corrosion inhibitor, and an ultraviolet absorber are each incorporated into separate thin overlays of an acrylate inter-polymer paint. The specular reflective mirrors are formed by vacuum-depositing silver over a polyester support film. Ultraviolet degradation of the polyester support, and consequent bubbling of the underlying adhesive, is reduced by incorporating UV absorbers in a second polymer coating that is applied over a first polymer coating, which incorporates a corrosion inhibitor. The first polymer coating is applied directly over the silver reflective surface. U.S. Pat. No. 4,645,714 is explicitly incorporated by reference as though fully set forth herein and to the extent not inconsistent with the disclosure herein.

SUMMARY

Described herein are solar reflectors which provide a low cost reflector construction that has a unique set of attributes: high solar reflectance, abrasion resistance, UV stability, mechanical integrity, and flexibility. While glass mirrors offer some of these characteristics, they are relatively expensive, lack flexibility, and break under high winds when in use outdoors. Conventional polymer film reflectors offer the desired characteristics noted above except for abrasion resistance. Described herein are polymer film solar reflectors providing for abrasion resistance by incorporating an abrasion-resistant coating to the polymer film reflector. The polymer film solar reflectors having an abrasion-resistant coating described herein offer a lower cost construction when compared to conventional polymer film reflectors due to their simpler construction.

Conventional polymer film reflectors provide good reflective properties, but do not offer the abrasion-resistance of the solar reflectors described herein. Without the abrasion resistance feature, reflectors must be cleaned using noncontact methods (e.g. pressure washing) and cannot be cleaned using a brushing or direct contact cleaning method that would scratch the reflector surface. Glass mirrors provide good abrasion resistance and can be cleaned with brushes, but they are expensive and breakable in comparison to the solar reflectors described herein. The abrasion-resistance of the polymer film reflectors described herein provides both durability and weatherability to materials that can significantly reduce the cost while having superior design flexibility compared with conventional reflectors.

In an embodiment, a solar reflector is provided, the solar reflector comprising: an abrasion-resistant coating; a reflective metal layer below the abrasion-resistant coating; an adhesive layer below the reflective metal layer; and a polymer film layer; wherein the polymer film layer is provided between the abrasion-resistant coating and the reflective metal layer, or wherein the polymer film layer is provided between the reflective metal layer and the adhesive layer.

In an aspect, the polymer film layer is provided between the abrasion-resistant coating and the reflective metal layer. In another aspect, the polymer film layer is provided between the reflective metal layer and the adhesive layer.

The solar reflectors described herein can comprise many different reflective metal layers. In an embodiment, for example, the reflective metal layer comprises silver or aluminum. In an aspect, the reflective metal layer comprises silver. In another aspect, the reflective metal layer comprises aluminum.

In an embodiment, a solar reflector is provided which further comprises a protective layer directly below the reflective metal layer. In an aspect, the protective layer comprises copper, nickel, chrome, a metal alloy, a metal oxide, or any combination of these. In another aspect, the protective layer comprises copper.

The abrasion-resistant coatings of the solar reflectors described herein can have many advantageous attributes, be provided in several configurations, and comprise many different materials. In an embodiment, for example, the abrasion-resistant coating comprises an acrylate. In another embodiment, the abrasion-resistant coating comprises ultraviolet absorbers. In a related embodiment, the abrasion-resistant coating prevents more than a one percent decrease in specular reflectance of the solar reflector when subjected to 30 cycles of abrasive exposure from a Taber wheel loaded at 250 grams, optionally a two percent decrease, optionally a three percent decrease. In another embodiment, the abrasion-resistant coating absorbs less than an average of four percent of electromagnetic radiation incident to the solar reflector having wavelengths selected over the range of 400 nanometers to 2,500 nanometers. In an aspect, the abrasion-resistant coating has a thickness selected over the range of 1 micron to 25 microns, optionally 5 micron to 25 microns, optionally 1 micron to 15 microns, optionally 1 micron to 10 microns. In an aspect, the abrasion-resistant coating is in physical contact with the polymer film layer. In an embodiment, the abrasion-resistant coating protects the polymer film layer, reflective metal layer, and adhesive layer from abrasion damage. In an aspect, the abrasion-resistant coating protects the polymer film layer, reflective metal layer, and adhesive layer from damage caused by electromagnetic radiation incident to the solar reflector having wavelengths selected over the range of 280 nanometers to 400 nanometers. In another aspect, the abrasion-resistant coating transmits less than five percent of electromagnetic radiation incident to the solar reflector having wavelengths selected over the range of 250 nanometers to 350 nanometers. In an aspect, the abrasion-resistant coating transmits greater than 33 percent of electromagnetic radiation incident to the solar reflector having wavelengths selected over the range of 350 nanometers to 400 nanometers. In an embodiment, the abrasion-resistant coating is the topmost layer of the solar reflector. In an embodiment, the abrasion-resistant coating is provided by gravure, reverse-roll, gap-coating, Meyer rod, slot-die, immersion, curtain, or air-knife application technique. In an aspect, the abrasion-resistant coating is provided by a slot die application technique.

The adhesive layer of the solar reflectors described herein can have many advantageous attributes, be provided in several configurations, and comprise many different materials. In an embodiment, for example, the adhesive layer comprises a pressure-sensitive adhesive. In another embodiment, the adhesive layer is chemically inert with respect to the reflective metal layer and the protective layer.

The polymer film layer of the solar reflectors described herein can have many advantageous attributes, be provided in several configurations, and comprise many different materials. In an embodiment, for example, the polymer film layer comprises a polyester or polycarbonate. In an aspect, the polymer film layer comprises a polyester comprising polyethylene terephthalate (PET), poly(ethylene-butene) (PEB), or polyethylene naphthalate (PEN). In an embodiment, the polymer film layer comprises ultraviolet absorbers. In an aspect, the polymer film layer prevents transmission of at least 95 percent of electromagnetic radiation incident to the solar reflector having wavelengths selected over the range of 200 nanometers to 380 nanometers. In another aspect, the polymer film layer transmits at least 96 percent of electromagnetic radiation incident to the solar reflector having wavelengths selected over the range of 380 nanometers to 2500 nanometers. In an embodiment, the polymer film layer has a thickness selected over the range of 10 microns to 150 microns, optionally 10 microns to 100 microns, optionally 10 microns to 50 microns, optionally 25 microns to 150 microns, optionally 25 microns to 100 microns.

The layers of the solar reflectors described herein can be provided with many different thicknesses and thickness ranges. In an embodiment, for example, the reflective metal layer has a thickness selected over the range of 0.05 micron to 0.15 micron. In an aspect, the reflective metal layer has a thickness of less than 0.15 micron. In an embodiment, for example, the protective layer has a thickness selected over the range of 0.002 micron to 0.15 micron. In an aspect, the protective layer has a thickness of less than 0.15 micron. In another embodiment, the adhesive layer has a thickness selected over the range of 5 microns to 100 microns.

The layers of the solar reflectors described herein can be treated to enhance desirable properties of the layers and the solar reflectors. In an embodiment, for example, a surface of the polymer film layer has been treated by an adhesion promotion technique. In an aspect, the adhesion promotion technique comprises a corona discharge, plasma, atomic layer deposition, or chemical etch adhesion promotion technique.

The solar reflectors described herein are compatible with a wide range of substrates. In an embodiment, for example, the adhesive layer is provided on a substrate. In an aspect, the substrate comprises sheet metal, aluminum, a hard polymer, a sturdy polymer, a thermally formed polymer, a zinc galvanized metal, or a removable backing.

The solar reflectors described herein are compatible with a wide range of solar and lighting related applications. In an embodiment, for example, a solar reflector as described herein is provided for use in a concentrating solar, solar tube, light shelf, laminated sheet, laminated sheet, or lighting reflector application.

The solar reflectors described herein can be provided in many desirable configurations. In an embodiment, for example, a solar reflector is provided comprising: an abrasion-resistant coating; a polyester layer directly below the abrasion-resistant coating; a silver layer directly below the polyester layer; a copper layer directly below the silver layer; and an adhesive layer directly below the copper layer; wherein the abrasion-resistant coating has a thickness selected over the range of 1 to 25 microns; wherein the copper layer has a thickness selected over the range of 0.002 micron to 0.15 micron; wherein the polyester layer comprises polyethylene terephthalate (PET); and wherein the silver layer has a thickness selected over the range of 0.05 micron to 0.15 micron.

In another embodiment, for example, a solar reflector is provided comprising: an abrasion-resistant coating; a silver layer directly below the abrasion-resistant coating; a copper layer directly below the silver layer; a polyester layer directly below the copper layer; and an adhesive layer directly below the polyester layer; wherein the abrasion-resistant coating has a thickness selected over the range of 1 to 25 microns; wherein the copper layer has a thickness selected over the range of 0.002 micron to 0.15 micron; wherein the polyester layer comprises polyethylene terephthalate (PET); and wherein the silver layer has a thickness selected over the range of 0.05 micron to 0.15 micron.

In an aspect, the abrasion-resistant coating is the only layer comprising acrylic. In another aspect, the solar reflector does not comprise an additional acrylic layer between the reflective metal layer and the abrasion-resistant coating. In a related aspect, the solar reflector does not comprise a PMMA layer below the abrasion-resistant coating.

Also provided herein are methods of using solar reflectors in solar and lighting related applications. In an embodiment, for example, a method of collecting solar radiation is provided, the method comprising: providing a solar reflector in optical communication with the sun; providing a target in optical communication with the solar reflector; and reflecting at least a portion of solar radiation incident on the solar reflector to the target; wherein the solar reflector comprises: an abrasion-resistant coating; a reflective metal layer below the abrasion-resistant coating; an adhesive layer below the reflective metal layer; and a polymer film layer; wherein the polymer film layer is provided between the abrasion-resistant coating and the reflective metal layer, or wherein the polymer film layer is provided between the reflective metal layer and the adhesive layer.

In another embodiment, a method of concentrating solar radiation is provided, the method comprising: providing a solar reflector having a point, linear, or plane focus, wherein the solar reflector is in optical communication with the sun; providing a target in optical communication with the solar reflector; and reflecting at least a portion of solar radiation incident on the solar reflector to the target; wherein the target is provided at the focus of the solar reflector; wherein the solar reflector comprises: an abrasion-resistant coating; a reflective metal layer below the abrasion-resistant coating; an adhesive layer below the reflective metal layer; and a polymer film layer; wherein the polymer film layer is provided between the abrasion-resistant coating and the reflective metal layer, or wherein the polymer film layer is provided between the reflective metal layer and the adhesive layer.

In an aspect, the target is a solar collector, photovoltaic device, absorber, or wall of a building.

In an embodiment, a method of collecting solar radiation is provided, the method comprising: providing a solar reflector in optical communication with the sun; providing a target in optical communication with the solar reflector; and reflecting at least a portion of solar radiation incident on the solar reflector to the target; wherein the solar reflector comprises: an abrasion-resistant coating; a polyester layer directly below the abrasion-resistant coating; a silver layer directly below the polyester layer; a copper layer directly below the silver layer; and an adhesive layer directly below the silver layer; wherein the abrasion-resistant coating has a thickness selected over the range of 1 to 25 microns; wherein the copper layer has a thickness selected over the range of 0.002 micron to 0.15 micron; wherein the polyester layer comprises polyethylene terephthalate (PET); and wherein the silver layer has a thickness selected over the range of 0.05 micron to 0.15 micron.

In another embodiment, a method of collecting solar radiation is provided, the method comprising: providing a solar reflector having a point, linear, or plane focus, wherein the solar reflector is in optical communication with the sun; providing a target in optical communication with the solar reflector; and reflecting at least a portion of solar radiation incident on the solar reflector to the target; wherein the target is provided at the focus of the solar reflector; wherein the solar reflector comprises: an abrasion-resistant coating; a polyester layer directly below the abrasion-resistant coating; a silver layer directly below the polyester layer; a copper layer directly below the silver layer; and an adhesive layer directly below the silver layer; wherein the abrasion-resistant coating has a thickness selected over the range of 1 to 25 microns; wherein the copper layer has a thickness selected over the range of 0.002 micron to 0.15 micron; wherein the polyester layer comprises polyethylene terephthalate (PET); and wherein the silver layer has a thickness selected over the range of 0.05 micron to 0.15 micron.

In another embodiment, a method of collecting solar radiation is provided, the method comprising: providing a solar reflector in optical communication with the sun; providing a target in optical communication with the solar reflector; and reflecting at least a portion of solar radiation incident on the solar reflector to the target; wherein the solar reflector comprises: an abrasion-resistant coating; a silver layer directly below the abrasion-resistant coating; a copper layer directly below the silver layer; a polyester layer directly below the copper layer; and an adhesive layer directly below the polyester layer; wherein the abrasion-resistant coating has a thickness selected over the range of 1 to 25 microns; wherein the copper layer has a thickness selected over the range of 0.002 micron to 0.15 micron; wherein the polyester layer comprises polyethylene terephthalate (PET); and wherein the silver layer has a thickness selected over the range of 0.05 micron to 0.15 micron.

In another embodiment, a method of collecting solar radiation is provided, the method comprising: providing a solar reflector having a point, linear, or plane focus, wherein the solar reflector is in optical communication with the sun; providing a target in optical communication with the solar reflector; and reflecting at least a portion of solar radiation incident on the solar reflector to the target; wherein the target is provided at the focus of the solar reflector; wherein the solar reflector comprises: an abrasion-resistant coating; a silver layer directly below the abrasion-resistant coating; a copper layer directly below the silver layer; a polyester layer directly below the copper layer; and an adhesive layer directly below the polyester layer; wherein the abrasion-resistant coating has a thickness selected over the range of 1 to 25 microns; wherein the copper layer has a thickness selected over the range of 0.002 micron to 0.15 micron; wherein the polyester layer comprises polyethylene terephthalate (PET); and wherein the silver layer has a thickness selected over the range of 0.05 micron to 0.15 micron.

BRIEF DESCRIPTION OF THE FIGURES

FIG. 12 provides a reflector construction of a solar reflector as described herein.

DETAILED DESCRIPTION

Figure 1:
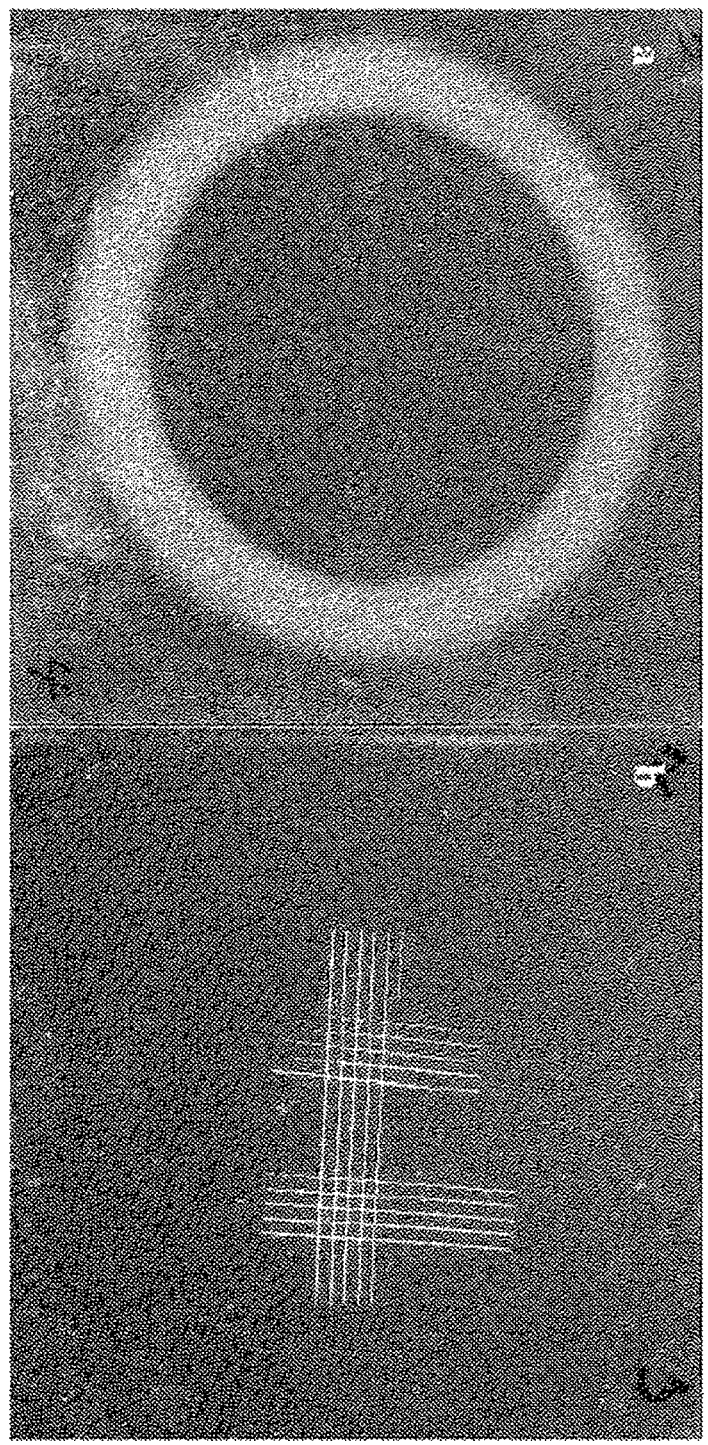
FIG. 1 provides an image after 30 Taber abrasion cycles of polymer film reflector samples (a) without and (b) with abrasion-resistant coating. The crosshatch pattern in (b) resulted from testing of coating adhesion.

Referring to the drawings, like numerals indicate like elements and the same number appearing in more than one drawing refers to the same element. In general the terms and phrases used herein have their art-recognized meaning, which can be found by reference to standard texts, journal references and contexts known to those skilled in the art. The following definitions are provided to clarify their specific use in the context of the invention.

As used herein, the term "solar reflector" refers to a reflector which has a high degree of reflectivity to incident electromagnetic radiation across the solar spectrum. In an embodiment, a solar reflector is provided wherein the solar reflector is greater than 90 percent reflective to incident electromagnetic radiation having wavelengths selected over the range of 200 nanometers to 2,000 nanometers. In an embodiment, a solar reflector is provided wherein the solar reflector is greater than 90 percent reflective to incident electromagnetic radiation having wavelengths selected over the range of 200 nanometers to 800 nanometers. In an embodiment, a solar reflector is provided wherein the solar reflector is greater than 90 percent reflective to incident electromagnetic radiation having wavelengths selected over the range of 400 nanometers to 2,000 nanometers. In an embodiment, a solar reflector is provided wherein the solar reflector is greater than 90 percent reflective to incident electromagnetic radiation having wavelengths selected over the range of 350 nanometers to 800 nanometers. In an embodiment, a solar reflector is provided wherein the solar reflector is greater than 90 percent reflective to incident electromagnetic radiation having wavelengths selected over the range of 400 nanometers to 800 nanometers.

As used herein, the term "abrasion-resistant coating" (abbreviated throughout as "ARC") refers to a coating which protects layers below the abrasion-resistant coating from damage. In an embodiment, an abrasion-resistant coating is provided as part of a solar reflector and has physical, optical, and chemical properties useful in solar reflector applications, such as abrasion-resistance, chemical inertness with respect to other layers of the solar reflector, and high transparency to electromagnetic radiation incident to the solar reflector having wavelengths selected over the range of 350 nanometers to 2,000 nanometers, optionally 400 nanometers to 800 nanometers, optionally 400 nanometers to 2,000 nanometers. In an embodiment, an abrasion-resistant coating protects layers beneath the abrasion-resistant coating from abrasion damage. As used herein, the term "abrasion damage" refers to physical damage to an object, such as a solar reflector. Examples of abrasion damage include, but are not limited to: damage caused by dirt or other particulate matter impacting a solar reflector due to applied force, such as force applied by wind; scratch damage; damage caused by cleaning instruments, such as brushes; and damage caused by the application of high pressure liquids to a solar reflector, such as high pressure liquids used in power washing applications.

As used herein, the term "adhesive layer" refers to a layer of a reflective stack providing adhesive properties which allow the reflective stack to be bonded to a useful structural substrate using conventional lamination application techniques. In an embodiment, an adhesive layer is chemically inert when in contact with a silver layer and/or a protective layer. As used herein, the term "chemically inert" refers to a chemical property of a first layer, wherein the layer does not cause a second layer to dissolve, become brittle, or substantially change the chemical composition of the second layer.

As used herein, the term "polymer film layer" refers to a layer of a reflective stack which provides mechanical stability to the reflective stack such that the reflective stack retains its mechanical properties over a wide range of temperatures and humidities. In an embodiment, for example, a polymer film layer as described herein comprises a polyester compound, for example polyethylene terephthalate (PET), poly(ethylene-butene) (PEB), or polyethylene naphthalate (PEN).

As used herein, the term "protective layer" refers to a layer of a reflective stack which provides corrosion protection to a reflective layer, such as a silver reflective layer. In an embodiment, for example, a protective layer comprises copper, nickel, chrome, a metal alloy, a metal oxide, or any combination of these.

As used herein, the term "acrylate" refers to a substance comprising an acrylate ion. Examples of acrylates include, but are not limited to acrylate polymers and acrylics. As used herein the term "acrylate polymer" refers to a polymer comprising repeating acrylate monomer units. As used herein the term "acrylic" refers to a substance comprising an acryloyl group. An example of an acrylic includes, but is not limited to, acrylic polymers comprising repeating acrylic monomer units.

As used herein, the term "ultraviolet absorbers" refers to compositions or compounds which absorb ultraviolet electromagnetic radiation. In an embodiment, for example, an ultraviolet absorber absorbs greater than 50 percent of incident electromagnetic radiation having wavelengths selected over the range of 200 nanometers to 400 nanometers.

As used herein, the term "topmost layer" of a solar reflector refers to the layer of the solar reflector closest to a source of electromagnetic radiation incident upon the solar reflector. In an embodiment, for example, the topmost layer of a solar reflector is an abrasion-resistant layer closest to the sun which provides electromagnetic radiation incident to the solar reflector.

As used herein, the term "adhesion promotion technique" refers to a method of treating a first layer of a reflective stack to increase the adhesion between the first layer and a second layer of the reflective stack. In an embodiment, an adhesion promotion technique is a corona discharge or plasma treatment technique. In another embodiment, the uppermost surface of a polymer film layer is subjected to an adhesion promotion technique to increase the adhesion between the polymer film layer and an abrasion-resistant coating of a solar reflector.

The methods and devices described herein are further detailed in the following Examples which are not intended to limit the scope of the claims in any way.

Example 1: Development and Testing of Abrasion Resistant Hard Coats for Polymer Film Reflectors Abstract Reflective polymer film technology can significantly reduce the cost of solar reflectors and installed Concentrated Solar Power (CSP) plants by both reduced material cost and lower weight. One challenge of polymer reflectors in the CSP environment pertains to contact cleaning methods typically used with glass mirrors. Such contact cleaning methods can scratch the surface of polymer reflectors and thereby reduce specular reflectance. A number of candidate ARC products were identified as candidate formulations. Samples were prepared having ARCs deposited onto a base polymer mirror film pre-laminated to aluminum sheet substrates. Samples were provided for evaluation and subjected to baseline (unweathered) and accelerated exposure conditions and subsequently characterized for abrasion resistance and adhesion. An advanced ARC product has been identified that exhibits outstanding initial abrasion resistance and adhesion to a base polymer mirror film. These properties were also retained after exposure to the various accelerated stress conditions. This material has been successfully manufactured as a 1.5 m wide roll-to-roll construction in a production environment.

1. Introduction

The desired ARC properties are high transparency and optical clarity, weatherability, abrasion resistance, strong adhesion to the base mirror film substrate, compatibility with high volume roll-to-roll production, and low material and manufacturing costs. A number of candidate ARC products such as UV-cured thermoset acrylates, polyurethanes, and vacuum deposited inorganic oxide hardcoats were identified as candidate formulations. Samples were prepared having different ARCs deposited onto a base polymer mirror film pre-laminated to aluminum sheet substrates (~10 cm×10 cm size). ARC coated samples were evaluated for baseline (unweathered) abrasion resistance and adhesion to the polymer film reflector material. Additional samples were also subjected to a variety of accelerated exposure conditions and subsequently tested for abrasion resistance and adhesion. A lead ARC formulation was identified and additional laboratory batch samples were prepared, roll-to-roll pilot and production scale materials were produced, and further weathering tests were conducted.

2. Experimental

A comprehensive test plan was devised to evaluate and demonstrate the abrasion protective properties of candidate hardcoats both as initially formulated/applied and as a function of expected in-service environmental conditions. Appropriate aspects of the plan included measurement of properties directly of interest (e.g. specular reflectance at several acceptance angles), use of applicable/relevant substrates (base polymer mirror film laminated to standard mill-finish aluminum), and exposure of candidate samples to the types of conditions expected in service both in terms of weathering and contact cleaning.

The base polymer mirror film construction used in these experiments is provided in Table A, below:

TABLE A

| Base Polymer Mirror Film Construction |
| --- |
| PROTECTIVE MASK |
| ACRYLIC FILM |
| LAMINATING ADHESIVE |
| PET FILM |
| SILVER |
| COPPER |
| PRESSURE SENSITIVE ADHESIVE |
| RELEASE LINER |

2.1. Screening Tests

In addition to demonstrating that the initial optical properties of the hardcoated base polymer mirror film are satisfied, it was important to confirm that abrasion resistance of unweathered materials is maintained after representative weathering has been experienced. For screening purposes, accelerated test exposures included UV light, condensation cycling, and thermal cycling. Candidate samples were subjected to UV exposure in an Atlas Ci5000 WeatherOmeter® as per ASTM G155 [1]. A xenon arc lamp source was filtered to provide a light intensity of about 2× the terrestrial solar spectrum. Temperature and relative conditions were held constant at 60° C. and 60% respectively. A Q-Lab QUV chamber was used to expose samples to cyclic condensation according to ASTM D4587 [2]. A UVA-340 light source was used having a 290-340 nm UV light spectrum. Samples were cycled between dry exposure at 60° C. with the light source on for 4 hours and 100% relative humidity (condensation) at 30° C. in the dark for 4 hours. ASTM D6944 (Method B) was used to perform thermal cycling tests of candidate samples [3]. Each cycle held the samples at −5° C. for 16 hours and then 50±3° C. for 8 hours; 30 cycles were completed.

A modified version of ASTM Standard D4060 was used to quantify abrasion resistance [4]. Abrasive stress was applied using a Taber abraser unit and a Devices and Services Specular Reflectometer were used to optically assess abrasive damage to the candidate ARCs and thereby monitor the performance parameter of direct interest namely, specular reflectance, as a function of the number of cycles. Taber abrasion is a severe stress compared to normal cleaning measures used in solar fields but it does allow a standardized protocol to obtain meaningful inter-comparisons of candidate materials samples. In terms of available standardized test procedures, the Taber abraser test is reported to have the highest correlation with the appearance of hardcoated films in actual use [5]. A minimum 250 g arm weight was used. Specular reflectance was measured at 660 nm, $\rho s(\theta, \lambda=660)$, at $\theta=7.5$ and 12.5 mrad (0.43°, and 0.72°) half acceptance angles. Specular reflectance was measured at four spots on each 10 cm×10 cm sized sample before abrasion, after 10 cycles, and after 30 cycles.

In addition to maintaining abrasion resistance, it is important that the ARC retain good adhesion to the base polymer mirror film underlayer before, during, and after weathering. Coating adhesion was measured using the ASTM D3359 cross-hatch tape peel test [6].

2.2. Additional Accelerated Weathering Tests

Beyond the requisite baseline abrasion resistance and adhesion properties demonstrated in screening tests, intrinsic UV weatherability is an essential requirement of organic-based materials (such as polymer mirror films and UV-cured acrylate coatings) that are expected to exhibit extended lifetimes under outdoor service conditions. The performance and durability properties of the standard base polymer mirror film product have been previously documented [7]. The most promising candidate ARC samples that passed the screening tests were subsequently subjected to further accelerated weathering tests to determine their resistance to UV exposure. Two accelerated UV exposure chambers were used. The first was an artificial solar simulator light source that uses a 1.4 kW xenon arc lamp to provide a ~2× terrestrial solar spectrum in the 300-500 nm bandwidth [1]. Four sets of identical samples are concurrently exposed under constant irradiance in each of four chamber quadrants that experience four combinations of temperature and relative humidity. This allows the effects of these stresses to be determined in parallel with resistance to UV.

Samples were also exposed at NREL's ultra-accelerated weathering system (UAWS) [8]. The UAWS uses special optical facets to reflect primarily the UV wavelengths of terrestrial natural sunlight to avoid overheating the samples during exposure. The UAWS facets use interference coatings deposited onto glass. These consist of multiple alternating layers of materials with high and low refractive indexes to selectively reflect the UV. The near infrared and visible wavelengths are attenuated to reduce the thermal loading of the material under test, since otherwise the intense heat would render the testing invalid. ARC coated base polymer mirror film samples were exposed at 100× concentration of natural UV sunlight for an equivalent of over 10 years outdoor exposure at 30° and 60° C.

To supplement Taber abrasion testing, another ASTM test (D2486) was also performed [9]. This test uses linearly articulated scrub brushes that are cycled in a back-and-forth motion 37 times per minute across the surface of ARC coated base polymer mirror film samples. A Byk Model PB5005 wet abrasion scrub tester was used to perform this test. Although designed to quantify the abrasion resistance of paint products, the test can simulate the most aggressive of solar mirror field cleaning processes.

As a further test of coating adhesion, samples of ARC coated base polymer mirror film laminated to aluminum sheet (36 cm×76 cm) were immersed in deionized water for extended timeframes. The coating was inspected for visual delamination and the cross hatch test [6] was used to further quantify durability.

3. Results 3.1. Screening Test Results

Abrasion resistance of candidate hardcoat formulations was screened by comparing the measured specular reflectance after 30 Taber abrasion cycles with measurements made before abrasion. Several dozen prospective vendors were contacted and requested to submit samples of ARC coated base polymer mirror film for evaluation. Seven hardcoat companies provided samples; these are designated as B through H in Table 1.1. Several of these prepared more than one formulation indicated by the numeric suffix in Table 1.1. Uncoated base polymer mirror film was included for comparative purposes and is denoted as vendor-formulation A-1.

TABLE 1.1

Abrasion resistance of candidate ARC coated base polymer mirror film

| Vendor-Formulation | Coating Type | Change in Specular Reflectance [$\Delta\rho_s(\theta = 12.5$ mrad)] after 30 Taber Cycles as a Function of Type of Weathering | | |
|---|---|---|---|---|
| | | None | Ci5000 (925 MJ/m² UV) | Condensation Cycles (215 cycles) | Thermal Cycles (30 cycles) |
| A-1 | None | 43.5 | | | |
| B-1 | TiO$_2$ | 43.9 | | | |
| C-1 | UV Cured Acrylate | 1.1 | 2.6 | 7.2 | 2.5 |
| C-2 | UV Cured Acrylate | 0.2 | 2.9 | 10.3 | 2.5 |
| C-3 | UV Cured Acrylate | 1.5 | 3.2 | 4.7 | 1.7 |
| C-4 | UV Cured Acrylate | 1.6 | 3.1 | 1.4 | 1.6 |
| D-1 | UV Cured Acrylate | 0.8 | 0.2$^b$ | 2.8 | 1.8 |
| D-2 | UV Cured Acrylate | 3.1 | 4.1$^b$ | 7.5 | 3.8 |
| E-1 | UV Cured Thermoset Acrylate | 7.2 | 17.3$^b$ | 9.1 | 4.6 |
| F-1 | PECVD SiO$_x$N$_y$ | 13.0$^a$ | | | |
| G-1 | Polyurethane | 18.5 | | | |
| G-2 | UV Cured Acrylate | 0.0 | b | | |
| H-1 | Polyaspartic | | | | 28.3 |
| H-2 | Polyaspartic | | c | | |

$^a$After 10 Taber cycles
$^b$Severe yellowing after UV exposure
$^c$ Coating unduly degrades unweathered reflectance Candidates B-1, F-1, and G-1 had unacceptable unweathered abrasion resistance, exhibiting over 10% loss in specular reflectance at 12.5 mrad half acceptance angle after 30 Taber cycles. The loss in specular reflectance of the unweathered E-1 sample was also quite high, and this sample also had poor abrasion resistance after weathering. In addition, E-1 severely yellowed after UV exposure equivalent to about 3 years outdoors (925 MJ/m² UV). Coating G-2 demonstrated excellent unweathered abrasion resistance but severely yellowed after Ci5000 exposure. Candidate H-1 was not tested prior to weathering but exhibited poor abrasion resistance after thermal cycling. The H-2 coating formulation reduced the unweathered solar-weighted hemispherical reflectance to unacceptable values (~86%). The two formulations provided by vendor D included a commercial product (D-1) and an experimental coating (D-2). D-2 showed marginal abrasion resistance unweathered and also after the various exposure conditions. The abrasion resistance of D-1 was excellent. The manufacturer claimed a 2 year useful outdoor lifetime. After two years equivalent outdoor exposure in the Ci5000, candidate D-1 had not degraded. However, after 3 years equivalent exposure the coating had severely yellowed.

Samples C-1 through C-4 were provided by Red Spot Paint & Varnish Company, Inc. These all demonstrated excellent unweathered abrasion resistance. C-1 and C-2 were existing ARC formulations used by Red Spot for other products and applications. C-3 and C-4 were new formulations offered by Red Spot that were tailored to the particular specifications for polymer film mirrors. The Red Spot samples all demonstrated very good abrasion resistance after 3 years equivalent outdoor UV exposure in the Ci5000 WeatherOmeter. Importantly, the C-3 and C-4 samples were returned to Ci5000 exposure for additional UV weathering. After a cumulative ~6.2 equivalent outdoor exposure these materials showed no yellowing or loss in spectral hemispherical reflectance. Formulation C-4 was also successfully re-formulated to withstand loss in abrasion resistance after condensation cycles, as indicated in Table 1.1.

The abrasion resistance of the C-4 material is shown visually in FIG. 1. FIG. 1, panel (a) illustrates the severe abrasion (circular track) experienced by uncoated base polymer mirror film after 30 Taber abraser cycles. When base polymer mirror film is coated with the C-4 formulation the effect of abrasion is nearly imperceptible, as shown in panel (b). Also evident in panel (b) is the cross-hatch pattern used to test coating adhesion. None of the Red Spot samples exhibited loss of adhesion before or after weathering.

Figure 2:
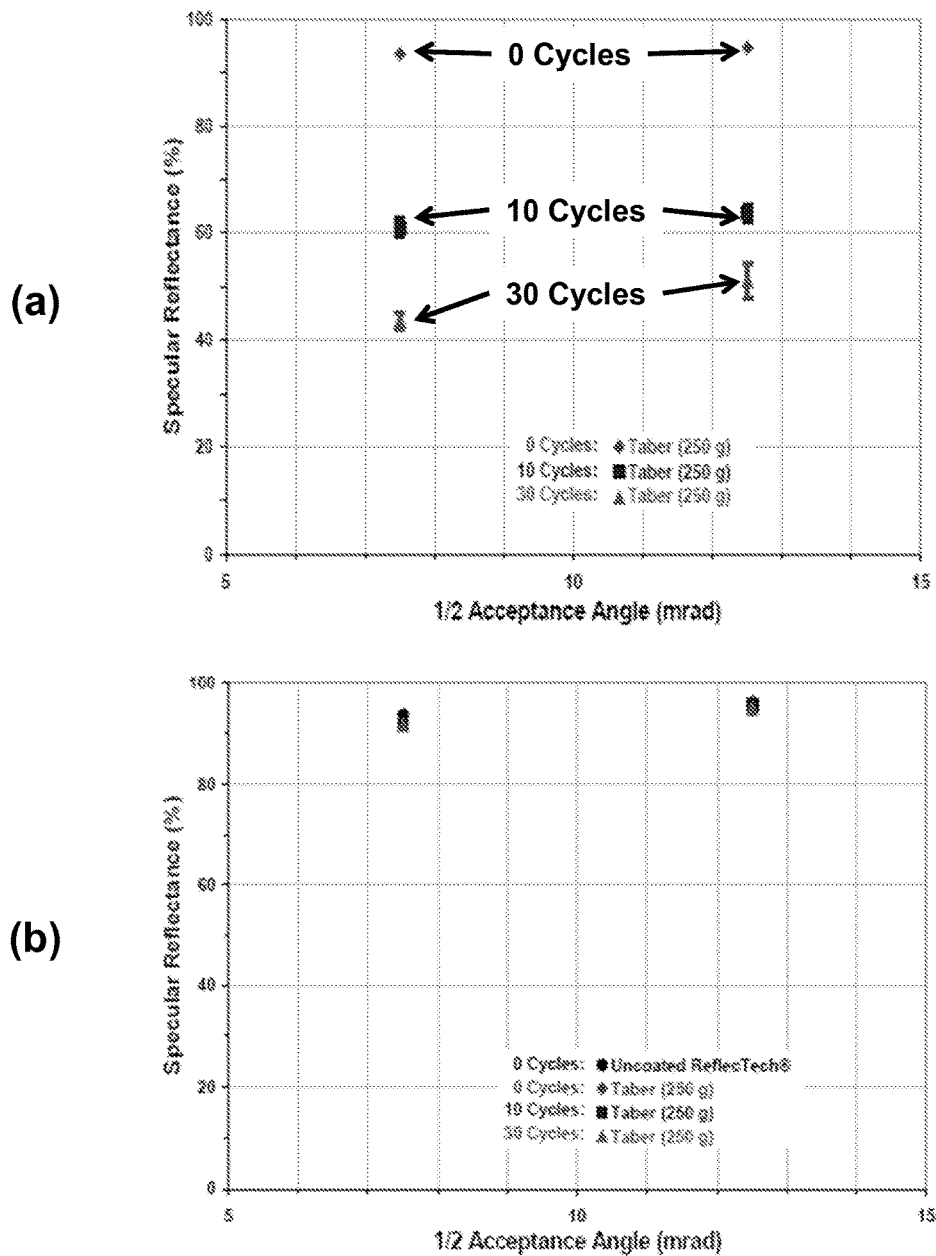
FIG. 2 provides a plot showing specular reflectance measurements after 0 (initial), 10, and 30 Taber abrasion cycles of abraded regions of polymer film reflector samples (a) without and (b) with abrasion resistant coating.

FIG. 2 presents measured specular reflectance data for the corresponding abraded base polymer mirror film and abraded ARC-coated base polymer mirror film samples. Without the ARC hardcoat, specular reflectance severely degrades after 10 and then 30 Taber abrasion cycle (as shown in FIG. 2, panel a). When coated with the C-4 ARC, the specular reflectance at 7.5 and 12.5 mrad half acceptance angles are virtually unchanged from the un-abraded uncoated base polymer mirror film values (as shown in FIG. 2, panel b).

3.2. Additional Accelerated Weathering Test Results

Figure 3:
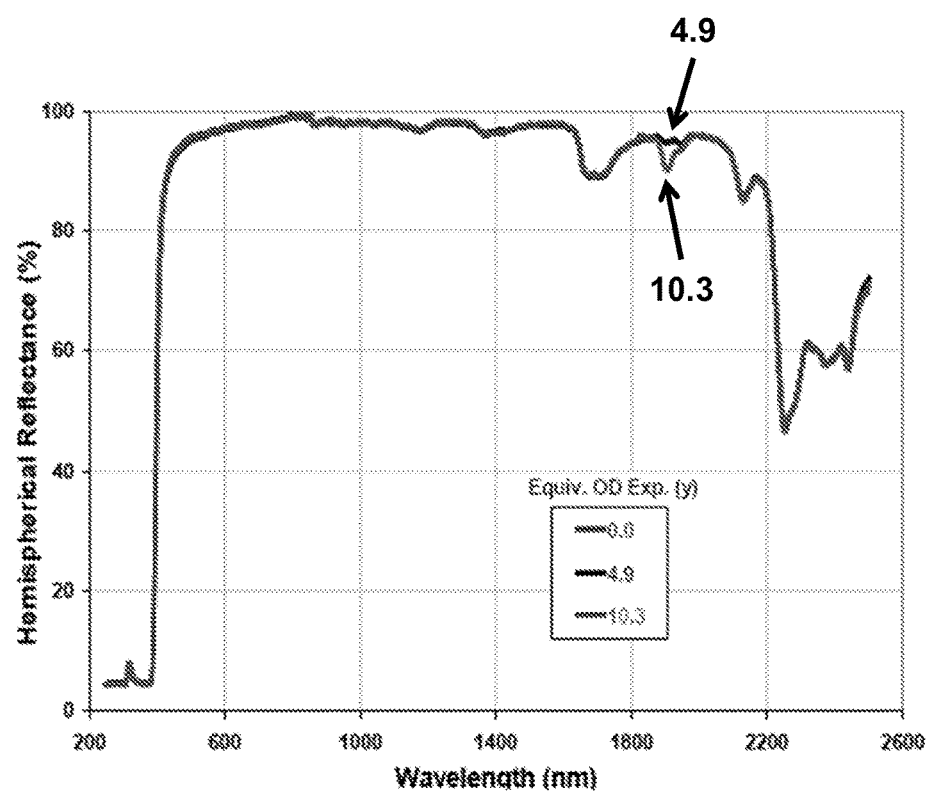
FIG. 3 provides a plot showing spectral hemispherical reflectance of ARC coated base polymer mirror film samples after 0 (initial), 4.9, and 10.3 years equivalent UV exposure. Samples were exposed at 30° C.
Figure 4:
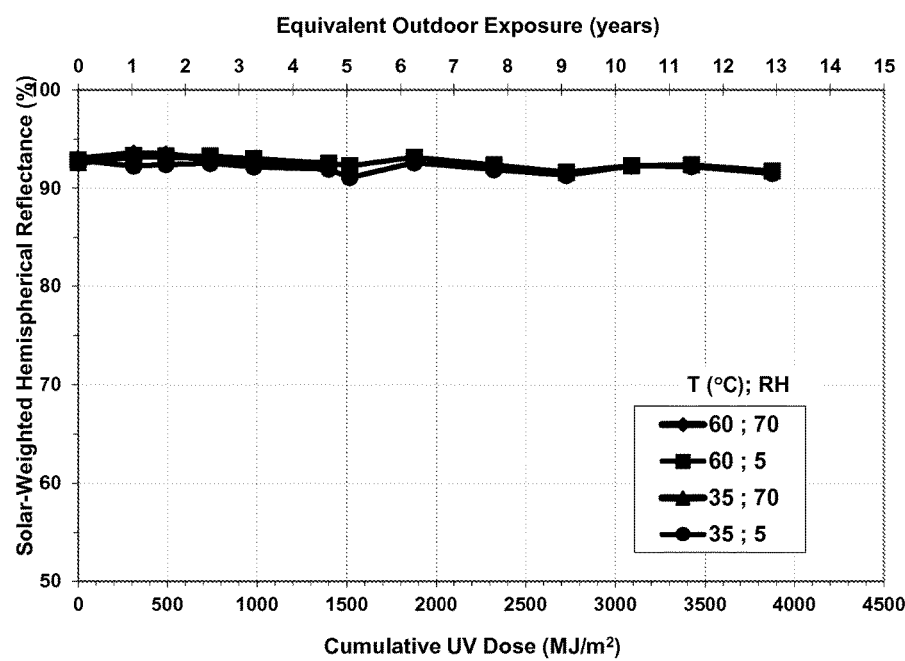
FIG. 4 provides a plot showing accelerated UV exposure of ARC coated base polymer mirror film in the NREL Solar Simulator chamber at 60° C., 70% RH; 60° C., 5% RH; 35° C., 70% RH; and 35° C., 5% RH.

Screening tests discussed above identified an advanced ARC product from Red Spot Paint & Varnish Company, Inc. that exhibits outstanding initial abrasion resistance and adhesion to base polymer mirror film. These excellent properties are also retained after exposure to various other accelerated stress conditions. FIG. 3 demonstrates the outstanding UV resistance of the ARC-base polymer mirror film material. FIG. 3 provides measurements of hemispherical reflectance (0-100%) as a function of wavelength (200-2600 nm) after the equivalent of 0, 4.9, and 10.3 years of ultraviolet light exposure. The hemispherical reflectance is above 80% for wavelengths between 400 nm and 2200 nm. After the equivalent of over 10 years UV exposure in NREL's UAWS there is no significant spectral loss in hemispherical reflectance. The small absorption band at ~1900 nm occurs at a region in the solar spectrum where very little solar resource is available. These results are for samples exposed at 30° C. Samples of this hardcoat have also demonstrated similar weatherability when exposed at the UAWS at a highly elevated temperature of 60° C. Samples have also been exposed in NREL's solar simulator chamber. FIG. 4 presents results for samples being exposed at 35° C. and 5% relative humidity (abbreviated throughout as "RH") and at 60° C. and 5% relative humidity. The solar-weighted hemispherical reflectance is above 90% for over 13 years of equivalent outdoor exposure (corresponding to a cumulative dose of about 3900 MJ/m$^2$). These samples have withstood a cumulative UV dose equivalent to nearly 8 years outdoors without loss in solar-weighted hemispherical reflectance. Companion samples being exposed at the same temperatures, but at 70% relative humidity, were discontinued for routine chemical analysis after 4 years equivalent outdoor UV exposure without degraded reflectance.

Figure 5:
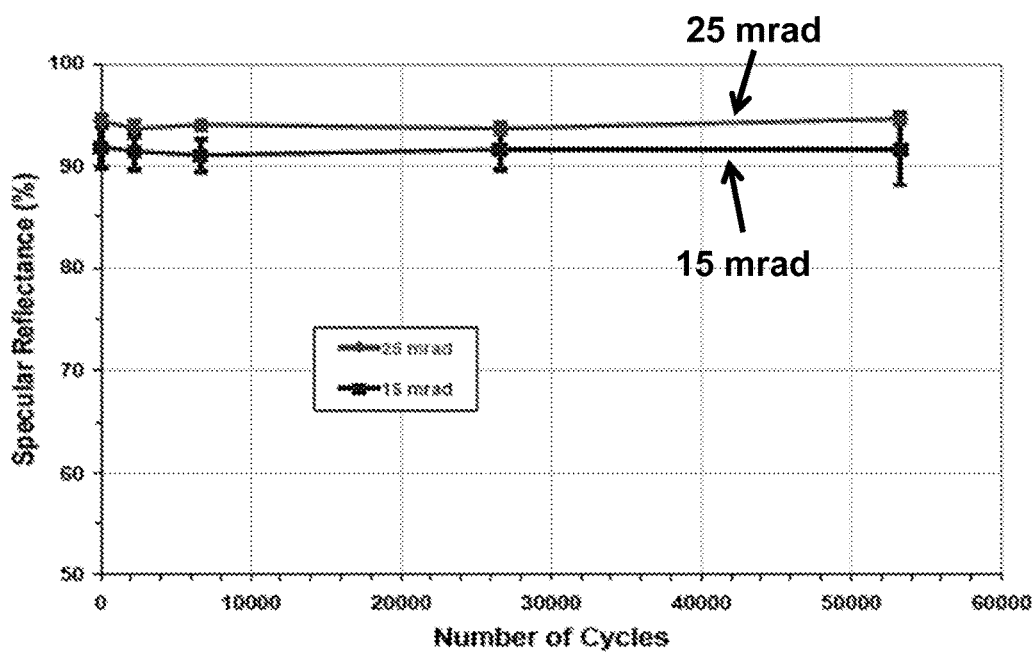
FIG. 5 provides a plot showing abrasion resistance (as measured by specular reflectance) exhibited by production run application of ARC to base polymer mirror film as a function of scrub brush cycles.

Taber abrasion is a particularly harsh test for abrasion resistance and is not representative of the type of abrasive stresses that solar mirrors might experience during standard reflector cleaning. It has, however, provided a standardized protocol that has allowed competing candidate ARC formulations to be compared and ranked. A slightly more realistic (although less aggressive) abrasion test subjects samples to scrub brush induced wear. This test was applied to the production version of ARC coated base polymer mirror film. As can be seen in FIG. 5, no loss in specular reflectance (θ=15 and 25 mrad full-acceptance angle) has occurred after over 50,000 back-and-forth scrub brush cycles which simulates more than 50 years of wear. In FIG. 5, the specular reflectance at both 15 mrad and 25 mrad is above 90% for 0-54,000 cycles. Furthermore, no scratches are visibly evident.

Samples of ARC coated base polymer mirror film laminated to aluminum panels were immersed in deionized water for 30 days. No visual indication of coating delamination was evident. The cross hatch tape peel test was also performed and no loss of adhesion was found.

3.3. Scale-Up Results

Based on screening test results and further accelerated testing, the Red Spot ARC formulation was selected to be used in a manufacturing environment. Laboratory samples were subsequently scaled up to pilot and ultimately production trials. At each step in this process sample materials were retested for their abrasion resistance, adhesion, and weatherability. Specular reflectance after abrasion for the Red Spot laboratory-prepared, pilot, and production trials have all been excellent. As shown in Table 1.2, for the batch laboratory prepared ARC sample after 30 Taber abraser cycles typically resulted in a change in specular reflectance at both 7.5 and 12.5 mrad half acceptance angles of ~1.6%. This same excellent abrasion resistance was maintained by comparable samples during the pilot run. All five pilot trials resulted in minimal specular reflectance loss with abrasion (~1-1.5% at 15 and 25 mrad). For samples prepared during the production trial the sample performance was again similar to the lab and pilot prepared samples with Δρs (θ=15.25 mrad)~1.5%.

TABLE 1.2

Maintenance of abrasion resistance from laboratory to pilot to production sample preparation.

| Sample Preparation | Change in Specular Reflectance [$\Delta\rho_s(\theta)$] after 30 Taber Cycles as a Function of Type of Weathering | |
|---|---|---|
| | $\theta$ = 7.5 mrad, half angle | $\theta$ = 12.5 mrad, half angle |
| Laboratory | 1.6 | 1.6 |
| Pilot | 1.4 | 1.4 |
| Production | 1.3 | 1.5 |

4. Conclusions

An advanced ARC product applied to base polymer mirror film has demonstrated excellent abrasion resistance, adhesion, and weatherability. A UV curable acrylate formulation from Red Spot Paint & Varnish Company, Inc. withstands Taber and scrub brush abrasion to the extent that visual effects are nearly imperceptible and measured specular reflectance is virtually unchanged. Resistance to Taber abrasion is maintained after exposure to UV light, condensation cycling, and thermal cycling. The hardcoat has demonstrated outstanding weatherability that includes highly accelerated exposure to over 10 years equivalent outdoor UV. This material has been successfully scaled up from batch laboratory samples through pilot conditions to being manufactured as a 1.5 m wide roll-to-roll construction in a production environment.

REFERENCES FOR EXAMPLE 1

[1] ASTM G155, "Standard Practice for Operating Xenon Arc Light Apparatus for Exposure of Non-Metallic Materials," Vol. 14.04, ASTM International, West Conshohocken, Pa., www.astm.org.
[2] ASTM D4587, "Standard Practice for Fluorescent UV-Condensation Exposures of Paint and Related Coatings," Vol. 06.01, ASTM International, West Conshohocken, Pa., www.astm.org.
[3] ASTM D6944, "Standard Test Method for Resistance of Cured Coatings to Thermal Cycling," Vol. 06.02, ASTM International, West Conshohocken, Pa., www.astm.org.
[4] ASTM D4060, "Standard Test Method for Abrasion Resistance of Organic Coatings by the Taber Abraser", American Society of Testing and Materials Annual Book of Standards, Vol. 06.01, ASTM International, West Conshohocken, Pa., www.astm.org.
[5] P. Moulds, "Hardcoats in the World of the Vacuum Coater", 42*nd Annual Technical Conference Proceedings, Society of Vacuum Coaters,* 1999, pp. 442-444.
[6] ASTM D3359, "Standard Test Methods for Measuring Adhesion by Tape Test", American Society of Testing and Materials Annual Book of Standards, Vol. 06.01, ASTM International, West Conshohocken, Pa., www.astm.org.
[7] M. DiGrazia, R. Gee, and G. Jorgensen, "ReflecTech Mirror Film Attributes and Durability for CSP Applications", ASME Conference, Proceedings of Energy Sustainability 2009, Jul. 19-23, 2009, San Francisco, Calif.
[8] H. K. Hardcastle, G. J. Jorgensen, and C. E. Bingham, "Ultra-Accelerated Weathering System I: Design and Functional Considerations", *Natural and Artificial Ageing of Polymers—4th European Weathering Symposium*; Reichert, T., Ed. Publication No. 11, Gesellschaft fur Umweltsimulation: Germany, 2009.
[9] ASTM D2486, "Standard Test Methods for Scrub Resistance of Wall Paints", American Society of Testing and Materials Annual Book of Standards, Vol. 06.02, ASTM International, West Conshohocken, Pa., www.astm.org.

Example 2: Durability Test Results for the Arc-Coated Base Polymer Mirror Film Samples Abstract One of the most promising developments for lowering the cost of utility scale concentrating solar power (CSP) is the emergence of durable reflective polymer films as an alternative to conventional curved glass mirrors. The broad adoption of wide web polymer film reflectors has been slowed by the lack of long-term weathering data. With the advent of the Ultra Accelerated Weathering System (UAWS), testing and development can proceed at a faster pace, and base polymer mirror film has recently exceeded the equivalent terrestrial UV cumulative dosage of 25 years.

A base polymer mirror film and an abrasion resistant coating (ARC) appropriate for application to polymer based mirror films was developed. This hardcoat was developed to address the need for reflectors that are low in cost, high in performance and durable to mechanical cleaning methods sometimes used in the CSP environment. The combined impact of these two developments has the potential to significantly change the preferred supply choice for solar reflectors in new utility scale CSP projects.

Base polymer mirror film samples prepared with and without the ARC hardcoat were subjected to accelerated exposure conditions more extreme than actual conditions. Both the uncoated and ARC films exhibit excellent weatherability with no loss in reflectance after highly accelerated exposure of over 25 years equivalent terrestrial UV. The ARC coated samples also exhibited outstanding initial abrasion resistance and adhesion to base polymer mirror film, properties that were retained after exposure to various accelerated stress conditions including condensation cycling, thermal cycling, water immersion, and accelerated exposure to UV light. The ARC coated base polymer mirror film has been successfully manufactured as a 1.5 m (5 ft) wide roll-to-roll construction in a commercial production environment.

Introduction

Durable highly reflective polymer film is a design innovation that makes possible significant cost reductions in solar field design and construction. It also enables greater design flexibility resulting in larger and lighter alternatives to typical curved glass mirrors in concentrating solar power (CSP) applications.

To be accepted as a viable alternative to glass mirrors, polymer reflectors had to overcome two historical problems with solar polymer films, delamination and optical durability.

Because reflectors installed in harsh outdoor environments are sometimes cleaned with contact cleaning methods we have developed an abrasion-resistant coating (ARC) for deposition onto polymer based mirror films. Samples were evaluated for baseline (unweathered) adhesion to the polymer film, and tested for initial abrasion resistance. Other samples were tested for abrasion resistance and adhesion after accelerated exposure conditions. The ARC coating exhibits outstanding abrasion resistance and adhesion to the polymer film both before and after various accelerated stress conditions.

Nomenclature

Specular reflectance—The amount of light reflected from a mirror surface into a prescribed acceptance angle.

Solar weighted hemispherical reflectance—The total amount of light reflected from a mirror surface averaged over all wavelengths representative of a terrestrial solar spectrum.

UV—Ultraviolet light is electromagnetic radiation with a wavelength in the spectrum between x ray and visible light in the range from 40 nm to 400 nm. For terrestrial CSP applications UV light between ~290-400 nm is particularly important.

ARC—Abrasion Resistant Coating
CSP—Concentrating Solar Power
UAWS—Ultra-Accelerated Weathering System
Tunneling—The separation of the reflective metal layer (e.g., silver layer) from the polymer film layer, typically in long finger-like patterns that appear like long tunnels.

Properties

The base polymer mirror film described herein has performance characteristics that make it a practical reflector technology for CSP applications. The base polymer mirror film construction used in these experiments is provided in Table B, below:

TABLE B

Base Polymer Mirror Film Construction

PROTECTIVE MASK
ACRYLIC FILM
LAMINATING ADHESIVE
PET FILM
SILVER
COPPER
PRESSURE SENSITIVE ADHESIVE
RELEASE LINER

The specular reflectance is 94% at 12.5 mrad half acceptance angle (at 660 nm) as measured by a Devices and Services specular reflectometer, and solar weighted hemispherical reflectance of 93%.

The ARC coating was developed for applications where abrasive contact cleaning methods are used to maintain reflectance of glass mirrors during outdoor service. Such contact cleaning methods can scratch the surface of polymer reflectors and thereby reduce specular reflectance. So the desired properties of a polymer film reflector with ARC coating includes resistance to contact cleaning (abrasion resistance) and strong adhesion of the hardcoat to the base mirror film substrate, along with high reflectance, weatherability to UV and moisture, compatibility with wide-web high-volume roll-to-roll production, and low material and manufacturing costs.

The selection of an ARC coating for polymer film reflector involved the evaluation of a number of candidates including UV-cured thermoset acrylates, polyurethanes, and vacuum deposited inorganic oxide hardcoats. Our evaluation identified one advanced ARC coating, made by Red Spot Paint & Varnish Company, Inc. (Red Spot) that demonstrated a clear advantage relative to other candidates [2], and test results to date are provided herein.

Accelerated Weathering Tests

A variety of accelerated tests have been undertaken to test and verify the outdoor weatherability of base polymer mirror film, and additional tests have been performed on ARC-coated base polymer mirror film.

The test plan developed to evaluate and demonstrate the properties of base polymer mirror film had to accomplish several critical objectives: a) demonstrate durability to prolonged UV exposure, b) demonstrate durability to prolonged moisture, and c) demonstrate durability to the combined effects of temperature, humidity and UV. The test plan for the ARC coated base polymer mirror film also had to demonstrate these properties, as well as exhibit abrasion resistance to methods that simulate contact cleaning used in CSP maintenance; and, establish the adhesion of the ARC coating to the polymer film. And these abrasion resistant properties had to be demonstrated even after accelerated weathering.

To test and verify outdoor durability, a variety of accelerated weathering tests were used; samples were subjected to conditions more extreme than expected in service both in terms of weathering and contact cleaning.

NREL's ultra-accelerated weathering system (UAWS). The UAWS concentrates terrestrial natural sunlight 100× with a 50× acceleration factor of UV. The technology, performance and correlation between the UAWS and more established methods have been previously documented [3]. The UAWS uses special materials that reflect primarily the UV wavelengths of terrestrial natural sunlight using interference coatings deposited onto glass. Thermal loading of the material under test is reduced by attenuating near infrared and visible wavelengths and by contact with chilled plates to control temperature at two levels during exposure, 30° and 60° C.

NREL's Solar Simulator as per ASTM G155 [4] exposes samples to ~2× terrestrial solar spectrum in the 300-500 nm bandwidth using a 1.4 kW xenon arc lamp [4]. Concurrent testing of 8 samples provide combinations of dry, wet, ambient, and hot using three stress factors of UV light, temperature and humidity. This allows the effects of these stresses to be determined in parallel with UV resistance.

Atlas Ci5000 WeatherOmeter® as per ASTM G155 [4] with a xenon arc lamp source is filtered to provide a light intensity approximately 2× the terrestrial solar spectrum while temperature is held constant at 60° C. and relative humidity at 60%.

Abrasion resistance of film with hardcoat is quantified using a modified version of ASTM Standard D4060 [5]. A Taber abraser unit is used to apply abrasive stress using a 250 g arm weight. Specular reflectance is measured before and after abrasive stress is applied, as a function of the number of cycles. While Taber abrasion is more severe than normal cleaning methods used in solar fields, it is used here to highlight the abrasion resistance of the selected ARC coating. Specular reflectance is measured at 660 nm, $\rho_s(\theta, \lambda=660)$, at $\theta=7.5$ and 12.5 mrad (0.43°, and 0.72°) half acceptance angles before abrasion, after 10 cycles, and after 30 cycles.

In addition to the Taber abrasion testing the selected candidate for ARC coating is subjected to an accelerated brush scrub test, as per ASTM D2486 [6] using linearly articulated scrub brushes that are cycled in a back-and-forth motion 37 times per minute across the surface of ARC coated polymer film reflector samples using a BYK Model PB5005 wet abrasion scrub tester. This test better simulates very aggressive solar mirror field cleaning.

To establish the adhesion of the ARC coating to the polymer film, the ASTM D3359 [7] cross-cut tape peel test is used. Six parallel knife blades are used to make a cross hatch pattern and a prescribed adhesive tape is applied and pulled away to detect the removal of any coating. The same cross-cut test is applied to test coating adhesion of 36 cm×76 cm samples after immersion in deionized water for 30 days. The coating is inspected for visual delamination and the cross-cut test is performed to further determine durability.

Hail testing is performed on both the uncoated and hardcoat polymer film laminated to 1.25 mm (0.050 in) aluminum sheet and tested in accordance with ASTM E 822-92 [8] and ASTM 1038-05 [9]. A Haag Engineering Co. model IBL-7 ice-ball launcher with a Stalker Pro velocity meter (radar gun) made by Applied Concepts, Inc. are used to launch and measure the velocity of frozen ice balls of prescribed diameters and speeds. Sample reflectors are made with the same curvature and width as installed panels. Hail impact sites were inspected using 10× lighted magnification to detect any indications such as haze, cracks, delamination or flaking in the base polymer film or ARC hardcoat.

Results

Test Results

Figure 6:
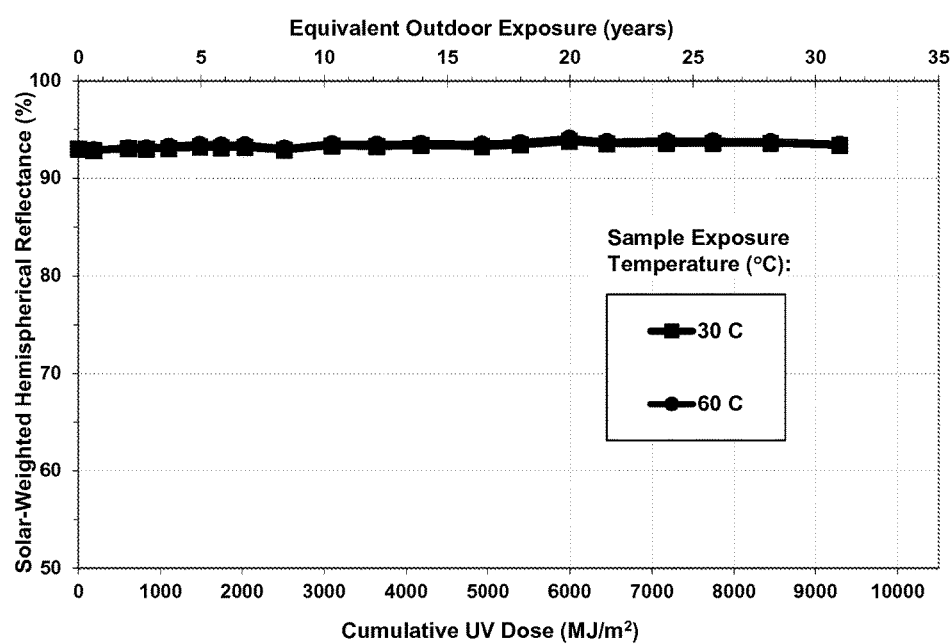
FIG. 6 provides a plot showing UAWS test results of uncoated and ARC coated base polymer mirror film after 25+ years equivalent UV dose at 30° C. and 60° C.

UAWS:

Regular and ARC coated base polymer mirror film samples exposed to 25 years equivalent UV dose in NREL's UAWS exhibited no significant loss in solar weighted hemispherical reflectance for samples exposed at both 30° C. and 60° C. FIG. 6 illustrates this UV resistance of the uncoated and ARC coated base polymer mirror film material. In FIG. 6, the solar-weighted hemispherical reflectance is above 90% for a UV cumulative dose of 0 to over 9,000 MJ/m$^2$ at both 30° C. and 60° C. exposure temperatures.

Solar Simulator:

Samples were exposed in NREL's Solar Simulator at 35° C. and 5% relative humidity and at 60° C. and 5% relative humidity. There was no loss in solar-weighted hemispherical reflectance after a cumulative UV dose equivalent of 10 years as illustrated in FIG. 4. ARC coated samples exposed at the same temperatures but 70% relative humidity were discontinued after damage caused by equipment failure associated with the incoming water line that provides relative humidity. Equipment failure occurred after samples had been exposed for a 4 year equivalent outdoor UV exposure with no degraded reflectance.

Figure 7:
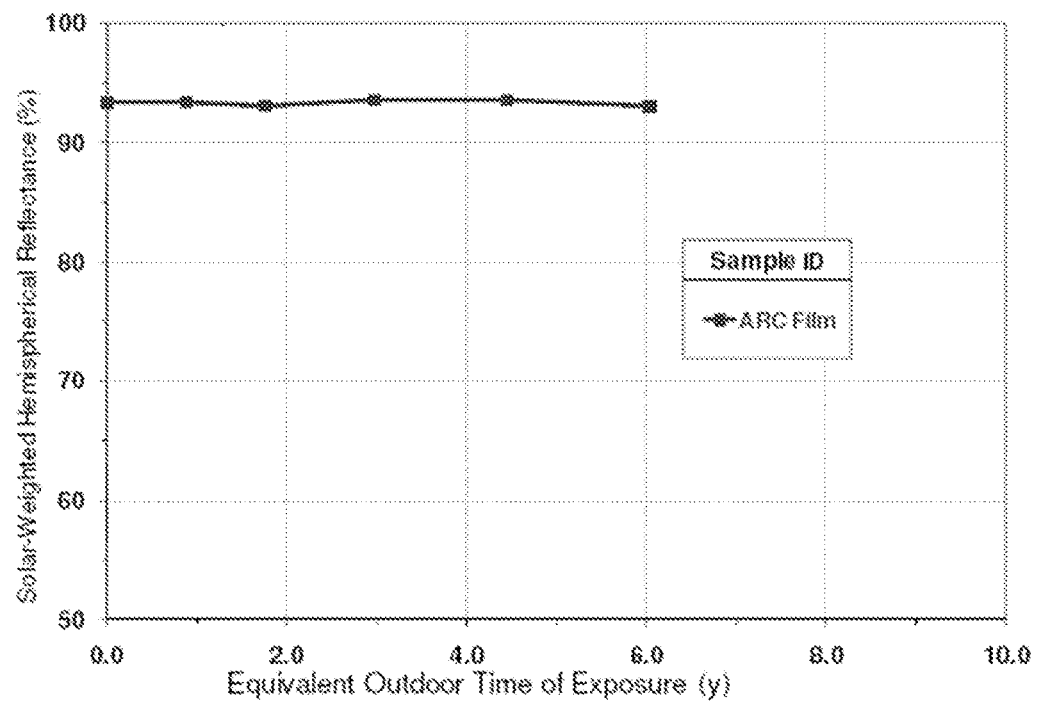
FIG. 7 provides a plot showing results of Atlas Ci5000 WeatherOmeter® testing of ARC film.

Atlas Ci5000 WeatherOmeter®:

ARC-coated base polymer mirror film demonstrated superior unweathered abrasion resistance in addition to robust abrasion resistance and optical durability after ~6.2 year's equivalent outdoor UV exposure in the Ci5000 WeatherOmeter®. Samples showed no yellowing or loss in spectral hemispherical reflectance as seen in FIG. 7 (solar-weighted hemispherical reflectance above 90% for equivalent outdoor exposure up to 6.2 years).

Abrasion Resistance:

Taber abrasion is a relatively extreme test for abrasion resistance and is not representative of the type of abrasive stresses that solar mirrors normally experience in the CSP environment. It was used to compare and rank competing candidate ARC formulations. FIG. 1 illustrates the abrasion resistance of the selected ARC material in panel (b) compared with uncoated polymer reflector material in panel (a). The uncoated ARC material was severely abraded after 30 Taber abraser cycles. The results of the polymer reflector coated with the selected ARC formulation after 30 Taber cycles indicates that damage is nearly imperceptible, as shown in panel (b).

Scrub Brush Test:

Taber abrasion was supplemented by a scrub-brush test to simulate actual cleaning practices common in CSP plant maintenance programs where glass reflectors have been installed. Brushes were cycled back and forth across the surface of the ARC coated polymer film reflector using a linearly articulated scrub brush tester operating at 37 cycles per minute. There was no measurable loss in specular reflectance at 7.5 mrad or 12.5 mrad after 53,000 scrub cycles, equivalent to more than 50 years of solar field maintenance.

Figure 8:
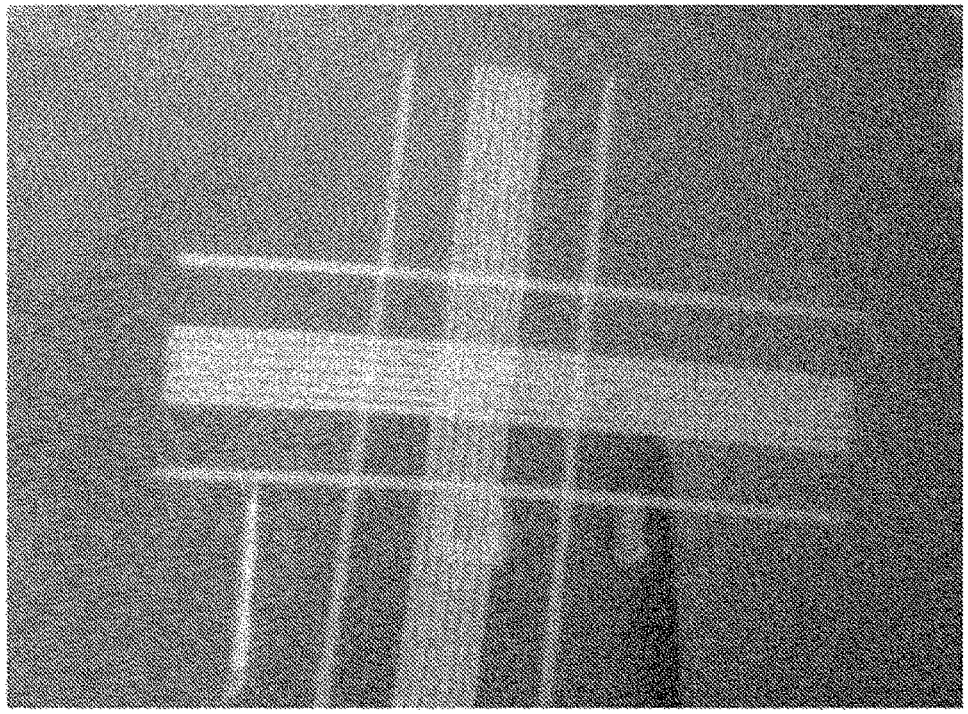
FIG. 8 provides a photograph showing results of an ASTM 3359, 1 mm cross-cut test indicating no loss of ARC coating adhesion to substrate polymer reflector for new and immediately after 30 day water immersion exposure.

Adhesion:

The coating adhesion of the ARC-coating to the polymer film reflector was tested with 1-mm cross-cut test as seen in FIG. 8. Tests were applied to ARC film laminated to an aluminum substrate before and immediately after immersion for 30 days in deionized water. The cross-cut test was also applied to samples after Ci5000 weathering exposure. The selected candidate for the coating of base polymer mirror film maintains coating adhesion to ASTM D3359, Class 5b before, during, and after weathering and abrasion tests. None of the Red Spot formulated ARC-coated samples exhibited delamination or loss of adhesion before or after immersion test or weathering tests.

Hail Test:

The polymer film reflector was subjected to frontal (mirror-side) and back-side (stow position) impacts of ice balls to simulate severe hail. Tests were performed at the National Renewable Energy Laboratory.

Frontal impacts (under compression) used ice balls of 38 mm (1.5 in) diameter launched at 35 m/s (78 mph). Visual inspection detected no cracking, flaking or delamination of the coating.

Impacts against the back-side of reflectors with ice balls as small as 32 mm (1.25 in) diameter launched at 32 m/s (71 mph) caused localized damage in only one of three impact locations. Damage was localized to an approximate diameter of 2 mm (0.08 in). The 38 mm (1.5 in) diameter hail launched at 35 m/s (78 mph) against the back-side of reflectors produced similar damage of approximately 3 mm (0.125 in) in diameter. No damage occurred to the polymer film or hardcoat from ice balls of 25 mm (1 in) diameter launched at 30 m/s (67 mph) against the backside of the reflector panel.

A 60 day water immersion test of impact locations on ARC coated and uncoated polymer film resulted in no degradation (delamination, tunneling, etc.) of impact areas. Ongoing inspection of samples exposed to outdoor weathering conditions for 11 months near Denver, Colo. has detected no degradation, delamination or spreading of damage from impact locations.

Water Immersion of Damaged Reflectors:

The use of polymer film reflectors prevents the most common cause of traditional glass mirror breakage, namely, wind induced stress. Glass reflector breakage frequently causes collateral damage to receivers and/or other glass mirrors impacted by falling glass.

Compared to glass, hazards to polymer reflectors in CSP environments are relatively rare. Potential causes of damage to polymer reflectors include independent receiver tube glass breakage, collision by cleaning vehicle, and vandalism.

To test the effect of damage from piercing a polymer reflector, a bullet hole was made. The panel remained intact except for the immediate area of the piercing. Immersion in deionized water for 60 days caused no additional spread of damage.

Field Repair:

A polymer film reflector installed at the SEGS II power plant in Dagget, Calif. sustained damage from falling glass of a receiver tube. Damage was limited to a square that was removed and replaced with new film. Repair was accomplished by applying a weatherable 12 mm wide aluminum tape over exposed edges.

Additional Test Results:

Cyclic condensation as per ASTM D4587 [10], with 60° C. dry, 30° C. at 100% RH for 100 cycles—Passed with no loss in reflectance.

Thermal cycling of ARC coated film as per ASTM D6944 (Method B) [11]—Passed with no loss in reflectance.

Bend test of ARC coated and uncoated film as per ASTM D522 [12] to 25 mm radius—Passed with no delamination or cracking.

Outdoor weathering of uncoated film, 5× UV concentration with water spray every sunlight hour for 7,500 hours [1]—Passed with no significant loss in reflectance.

Water immersion of ARC coated samples [2] and uncoated film to 60 days [1] at ambient temperature—Passed with no delamination, loss of adhesion, blistering or loss in reflectance.

Conclusions

A reflective polymer film was tested as a function of UV, moisture, abrasion and hail impact with and without an ARC hardcoat produced by Red Spot Paint and Varnish. The hardcoat was developed for application to base polymer mirror film to make the base polymer film resistant to abrasion from contact cleaning methods.

The equivalent of 25 years cumulative UV dose resulted in no appreciable loss in solar weighted hemispherical reflectance of the polymer film with and without the hardcoat. The equivalent of 10 years cumulative UV in combinations of temperature and humidity levels resulted in no loss of solar-weighted hemispherical reflectance for regular and hardcoat mirror film.

Specular reflectance of the hardcoat film was measured before and after Taber abraser testing with 250 g and 30 cycles, and scrub-brush test to 53,000 cycles with no appreciable drop in specular reflectance at both 7.5 and 12.5 mrad half acceptance angles. Hail testing resulted in no damage to the film or hardcoat from ice balls up to 38 mm launched at 35 m/s at front side of reflectors, and 25 mm diameter launched at 30 m/s against the back side of reflectors with and without the ARC hardcoat. Punctures from front and back entrance bullet holes showed no propagation of damage after 60 days immersion in water. Successful field repair of damaged film was accomplished.

Adhesion of the hardcoat to base polymer mirror film was confirmed through cross-cut tests before and after water immersion and weathering. This same exceptional abrasion resistance and adhesion was maintained through five roll-to-roll pilot production campaigns.

REFERENCES FOR EXAMPLE 2

[1] M. DiGrazia, R. Gee, and G. Jorgensen, "ReflecTech® Mirror Film Attributes and Durability for CSP Applications", ASME Conference, Proceedings of Energy Sustainability 2009, Jul. 19-23, 2009, San Francisco, Calif.

[2] G. Jorgensen, R. Gee, M. DiGrazia, "Development and Testing of Abrasion Resistant Hard Coats for Polymer Film Reflectors", *SolarPACES* 2010, Perpignan, France, Sep. 21-24, 2010.

[3] H. K. Hardcastle, G. J. Jorgensen, and C. E. Bingham, "Ultra-Accelerated Weathering System I: Design and Functional Considerations", Natural and Artificial Ageing of Polymers—4th European Weathering Symposium; Reichert, T., Ed. Publication No. 11, Gesellschaft fur Umweltsimulation: Germany, 2009.

[4] ASTM G155, "Standard Practice for Operating Xenon Arc Light Apparatus for Exposure of Non-Metallic Materials," Vol. 14.04, ASTM International, West Conshohocken, Pa., www.astm.org.

[5] ASTM D4060, "Standard Test Method for Abrasion Resistance of Organic Coatings by the Taber Abraser", American Society of Testing and Materials Annual Book of Standards, Vol. 06.01, ASTM International, West Conshohocken, Pa., www.astm.org.

[6] ASTM D2486, "Standard Test Methods for Scrub Resistance or Wall Paints", American Society of Testing and Materials Annual Book of Standards, Vol. 06.02, ASTM International, West Conshohocken, Pa., www.astm.org.

[7] ASTM D3359, "Standard Test Methods for Measuring Adhesion by Tape Test", American Society of Testing and Materials Annual Book of Standards, Vol. 06.01, ASTM International, West Conshohocken, Pa., www.astm.org.

[8] ASTM E 822-92, "Standard Practice for Determining Resistance of Solar Collector Covers to Hail by Impact with Propelled Ice Balls", Vol. 12.02, ASTM International, West Conshohocken, Pa., www.astm.org.

[9] ASTM E 1038-05, "Standard Test Method for Determining Resistance of Photovoltaic Modules to Hail by Impact with Ice Propelled Ice Balls", Vol 01.05, ASTM International, West Conshohocken, Pa., www.astm.org.

[10] ASTM D4587, "Standard Practice for Fluorescent UVCondensation Exposures of Paint and Related Coatings," Vol. 06.01, ASTM International, West Conshohocken, Pa., www.astm.org.

[11] ASTM D6944, "Standard Test Method for Resistance of Cured Coatings to Thermal Cycling," Vol. 06.02, ASTM International, West Conshohocken, Pa., www.astm.org.

[12] ASTM D522, "Standard Test for Mandrel Bend Test of Attached Organic Coatings," Vol. 06.01, ASTM International, West Conshohocken, Pa., www.astm.org.

Although the description herein contains many specifics, these should not be construed as limiting the scope of the invention, but as merely providing illustrations of some of the embodiments of the invention.

Example 3: Durability Test Results for Arc-Coated Metalized Pet Samples

A length of metalized PET was used for an experiment to determine the reflectance resulting from a 4 micron ARC coating, UVT786 made by Red Spot Paint and Varnish on the polymer side of a metalized PET film. The metalized PET film was 92 Gauge thick and 62 inches wide in a length of approximately 300 feet metalized with approximately 1000 angstroms of silver against the PET and 150 angstroms of copper against the silver. This construction is shown in Table 3.1.

TABLE 3.1

| ARC Coated Metalized PET Reflector Construction |
| --- |
| ABRASION-RESISTANT COATING (ARC) |
| PET (92 GAUGE, 23.4 MICRONS) |
| SILVER (1000 ANGSTROMS) |
| COPPER (150 ANGSTROMS) |

Specular reflectance was measured using a Devices and Services specular reflectometer model 15R-USB at three acceptance angles. These measurements of specular reflectance are presented in Table 3.2

TABLE 3.2

Specular reflectance of ARC Coated Metalized PET Reflector

| Acceptance Angle (mrad) | Specular Reflectance (660 nm) |
|---|---|
| 46 | 96.0 |
| 25 | 95.3 |
| 7 | 95.0 |

The specular reflectance of the ARC coated metalized PET film is higher than the baseline base polymer mirror film and the ARC coated base polymer mirror film.

Example 4: An Improved Low-Cost Highly-Weatherable Solar Reflector with High Abrasion Resistance Background Reflective polymer film technology can significantly reduce the cost of solar reflectors and installed concentrating solar power (CSP) plants by both reduced material cost and power weight. One challenge of power reflectors in the CSP environment is associated with contact cleaning methods typically used with glass mirrors. Such contact cleaning methods can scratch the surface of polymer reflectors and thereby reduce specular reflectance. As used herein, PET is polyethylene terephthalate.

TABLE 4.1

Basic Construction Of Base Polymer Mirror Film.

PROTECTIVE MASK
ACRYLIC FILM
LAMINATING ADHESIVE
PET FILM
SILVER
COPPER
PRESSURE SENSITIVE ADHESIVE
RELEASE LINER

Solar Reflectors

We found excellent abrasion resistance by the ARC (including after exposure to a variety of accelerated weathering conditions including UV light, condensation, cycling, and thermal cycling) as well as excellent adhesion of the ARC to the acrylic top layer, and outstanding UV characteristics.

Weatherability of the ARC and the ARC-Base Polymer Mirror Film Construction.

Incorporation of an ARC layer provides increased UV protection along with abrasion resistance for the construction provided in Table 4.2.

TABLE 4.2

ARC-Base Polymer Mirror Film Construction

ARC
ACRYLIC FILM
LAMINATING ADHESIVE
PET FILM
SILVER
COPPER
PRESSURE SENSITIVE ADHESIVE
RELEASE LINER

The abrasion resistant properties of the ARC material are shown visually in FIG. 1. The picture in panel (a) illustrates the severe abrasion (circular track) experienced by uncoated base polymer mirror film after 30 Taber abraser cycles. When base polymer mirror film is coated with an ARC formulation the effect of abrasion is nearly imperceptible, as shown in panel (b). Also evident in panel (b) is a cross-hatch cut pattern used to test coating adhesion. Samples have also not exhibited any loss of adhesion before and after weathering. FIG. 1 provides a digital image after 30 Taber abrasion cycled for polymer film reflector without (panel a) and with (panel b) abrasion resistant coating. Cross-hatch pattern in panel b was used to characterize coating adhesion and is unrelated to Taber abrasion test.

FIG. 2 presents measured specular reflectance data for the corresponding abraded base polymer mirror film and abraded ARC-base polymer mirror film samples shown in FIG. 1. Without the ARC hardcoat, specular reflectance severely decreases after 10 and then 30 Taber abrasion cycles, as shown in FIG. 2, panel (a). When coated with the ARC, the specular reflectance at 7.5 and 12.5 mrad half acceptance angles are virtually unchanged from un-abraded and uncoated base polymer mirror film values, as shown in FIG. 2, panel (b). FIG. 2 provides data showing specular reflectance measurements of abraded regions after 0 (initial), 10, and 30 Taber cycles without (panel a) and with (panel b) ARC.

FIG. 4 presents test results for samples exposed in NREL's solar simulator chamber at 35° C. and 5% relative humidity and at 60° C. and 5% relative humidity. These samples have withstood a cumulative UV dose equivalent to nearly 8 years outdoors with little-to-no loss in solar-weighted hemispherical reflectance. FIG. 4 presents a plot showing accelerated UV exposure of ARC-Base Polymer Mirror Film in solar simulator chamber at 5% and 70% RH (relative humidity) and 35° C. and 60° C.

FIG. 6 further demonstrates the outstanding UV resistance of the ARC-Base Polymer Mirror Film material. After the equivalent of 18 years UV exposure in NREL's Ultra-Accelerated Weathering System (UAWS) there is no significant loss in hemispherical reflectance. These results are for samples exposed at 30° C. and 60° C., a highly elevated exposure temperature. At both exposure temperatures, a variety of sample processing conditions were used, including dry film thicknesses (DFT) of 4 and 6μ and line speeds of 12, 18, and 25 feet per minute, in all cases excellent weatherability is seen (solar-weighted hemispherical reflectance above 90% for cumulative UV doses over 9000 MJ/m$^2$, corresponding to over 30 years equivalent outdoor exposure).

As an improved construction, elimination of the acrylic UV screening film/layer (and the lamination adhesive) as shown in Table 4.3 can save material and processing costs and improve the optical performance of the stack (i.e., it can have higher reflectance without losses associated with the acrylic film and laminating adhesive). Improved ARC-Base Polymer Mirror Film construction in which acrylic film and laminating adhesive are eliminated by depositing ARC directly into PET film or by using an optional adhesive-promoting seed layer to adhere the ARC to the PET, as shown in Table 4.3.

TABLE 4.3

Improved ARC-Base Polymer Mirror Film constructions

| | |
|---|---|
| ARC | ARC |
| PET FILM | OPTIONAL ADHESIVE |
| SILVER | SEED LAYER |
| COPPER | PET FILM |
| PRESSURE SENSITIVE | SILVER |

TABLE 4.3-continued

Improved ARC-Base Polymer Mirror Film constructions

| ADHESIVE (PSA) | COPPER |
| RELEASE LINER | PRESSURE SENSITIVE ADHESIVE (PSA) RELEASE LINER |

The ARC has demonstrated excellent weatherability and UV screening properties. This layer/hardcoat can be applied or deposited onto the metalized PET film as shown in Table 4.3, left. A potential difficulty for some applications is the ARC formulation may not adhere sufficiently well to PET. In this case, a thin adhesion-promoting seed layer (such as silica, alumina, or a thin coating of acrylic) can be deposited onto the PET to provide a surface having the requisite adhesion properties to be compatible with the ARC, as shown on the right in Table 4.3.

PET is inexpensive, has good mechanical properties (in particular, is not brittle and has good tear strength) and highly reflective metal coatings can be easily deposited onto them without compromising the requisite specular reflectance properties. A potential difficulty for some applications is that ARCs that have good initial adherence to PET may not exhibit long term weatherability (for example, limited to ~2 years). Either they lose their adherence to the PET which and may not provide sufficient UV screening of the PET (which is particularly susceptible to UV degradation that causes yellowing and embrittlement) and/or the ARC-Base Polymer Mirror Film interface. This can result in early term failure of the mirror.

We have been able to protect polycarbonate (PC) with either UV-screening acrylic film (KORAD) or with UV-screening lacquers (~6-10 thick). Lifetimes of 10-20 years equivalent cumulative UV dose have been demonstrated. Similar samples of Korad laminated to PET have also been subjected to accelerated weathering in NREL's weatherometers. We find that Korad does not screen wavelengths to which PET are particularly susceptible, and the PET underlayer film degrades (yellow and loses transmittance). The typical UV screening cut-on wavelength of ~390 mm is sufficient to protect PC but not PET. Activation spectra experiments can be performed with PET to see what wavelengths are particularly deleterious to PET. The UV screening functionality of the ARC can then be tuned to provide the desired better protection of the PET. This can be accomplished by adjusting the UV absorber package added to the ARC formulation to move the UV cut-on wavelength sufficiently high enough to provide protection to PET, but still allow reflection of enough of the solar spectrum (by the reflective layer deposited onto the backside of the PET) to be a viable solar mirror.

The top layer in Table 4.3 can also be a weatherability self-cleaning/anti-soiling coating, or a combination or hybrid formulation that combines these properties with abrasion resistance. The construction is shown in Table 4.4, in which layer #1 is an ARC and/or anti-soiling/self-cleaning and/or hybrid layer that is weatherable and UV-screening. Layer #2 is an optional adhesion-promoting seed layer that can be vacuum deposited (or otherwise deposited) in organic oxide to a thin layer of acrylic (co-extruded with layer #3, or lacquered or spray coated or dip coated or spin coated, etc.). Layer #3 is a polymer film such as (but not limited to) PET or PC.

Window Films

Window films are typically intended to provide solar heat reduction (lower cooling loads) and to otherwise control sunlight to improve inside comfort, protect interior furnishings from terrestrial UV, and reduce internal glare. An example construction is: ARC/PET/Ag. Improved constructions can include those shown in Table 4.5, where Layers 1-3 are the same as those in Table 4.4. Considerations regarding such longer lived window film constructions are the same as those provided in the section on solar reflectors, above.

TABLE 4.4

Enhanced ARC-Base Polymer Mirror Film construction.

LAYER #1
LAYER #2
LAYER #3
SILVER
COPPER
PSA
RELEASE LINER

TABLE 4.5

Improved window film construction.

LAYER #1
LAYER #2
LAYER #3
SILVER

Example 5: Clear Polymer Film with Abrasion Resistant Protective Coating for Weatherability Polymer mirror films are a low cost alternative to glass mirrors. Applications such as utility scale concentrating solar power (CSP) require mirrors to reflect solar energy to produce power. The problem with polymer based mirrors for outdoor application is resistance to ultraviolet (UV) radiation, resistance to moisture, resistance to abrasion (from contact cleaning) and durability to ambient temperatures. Current clear films including polymer (PET) plastic, polycarbonate (PC), and acrylic (PMMA) are not sufficiently resistant to scratching from surface cleaning and to UV. Base Polymer Mirror Film is indeed weatherable to a UV resistant PMMA layer. It is suitable for CSP applications however reflectance is reduced by contact cleaning methods as currently used to clean glass mirrors at CSP locations.

Figure 9:
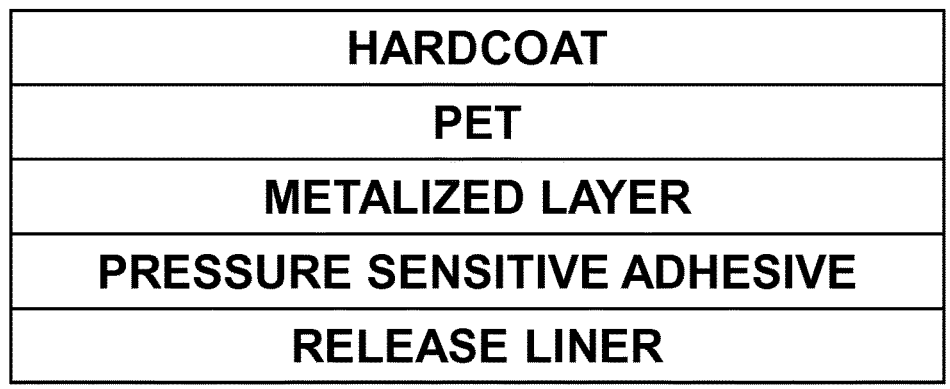
FIG. 9 provides a reflector construction of a solar reflector as described herein.

Through our research, a hard coat material has been identified to achieve excellent scratch resistance, UV stability and adhesion to the PMMA top polymer on the Base Polymer Mirror Film. Testing has confirmed resistance of this coating to an equivalent UV dose of 20 years without yellowing, hazing, crazing, or delamination. The hardcoat's 20-year durability to UV combined with scratch resistance and adhesion can provide sufficient weatherability to eliminate the PMMA layer in Base Polymer Mirror Film. FIG. 9 illustrates this construction.

Figure 10:
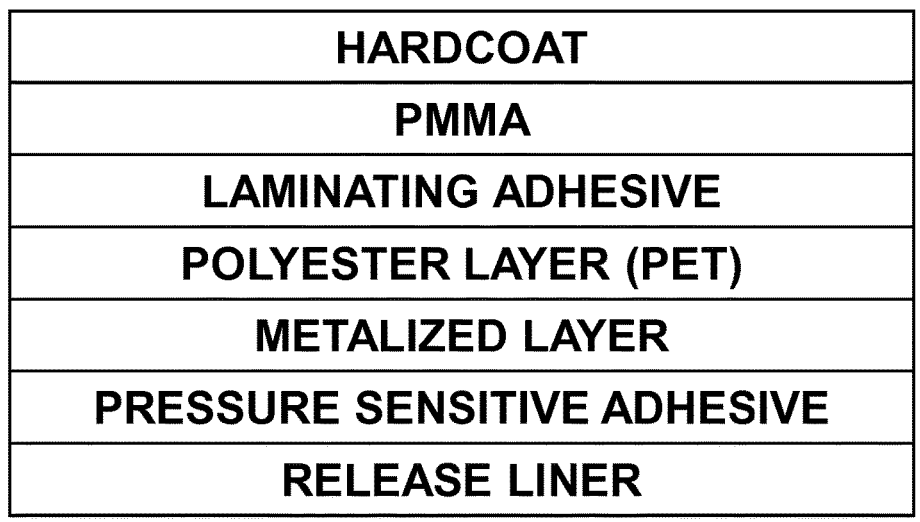
FIG. 10 provides a reflector construction of a solar reflector as described herein.

The construction likely has the best potential for highest reflectance since light passes through only one layer (PET). Another tested construction is provided in FIG. 10. Alternative plastics can be coated with this hardcoat to improve weatherability. If the coating itself does not provide sufficient UV screening, UV absorbers can be formulated into the plastic (PSA, PC, PMMA) to extend life. By the use of a UV absorbing scratch resistant hardcoat it is possible to make a lower cost reflector that is weatherable in a CSP environment. The hardcoat can provide sufficient adhesion to the metalized PET or PC to replace the protective UV screening PMMA in the Base Polymer Mirror Film. If adhesion of the hard coat is an issue either a corona treatment or a seed layer can improve adhesion to PET or PC.

Background

We have developed an abrasion resistant coating (ARC), aka hardcoat, that can be applied to the Base Polymer Mirror Film. For one ARC (provided by Red Spot Paint & Varnish Co.), testing has found it to be very mechanically stable, weatherable to UV light, and resistant to scratching. The Red Spot ARC has also been found to adhere very strongly to the acrylic film on the Base Polymer Mirror Film.

Discussion

A hardcoat/ARC that is weatherable outdoors for 20 years is a large improvement compared to all existing hardcoats that are known (generally known to have outdoor lifetimes below 5 years). This excellent weatherability led to the improvement of using the hardcoat to fully replace the outermost layer of polymer film (an acrylic film) that is used on Base Polymer Mirror Film. Base Polymer Mirror Film relies on the acrylic film layer to screen out the ultraviolet light that would otherwise degrade/damage the underlying materials in Base Polymer Mirror Film (e.g., silver polyester) and result in lower reflectance, making the reflector of no practical value. Since the Red Spot ARC/hardcoat is itself a good UV screen, the UV-screening acrylic can be eliminated.

Figure 11:
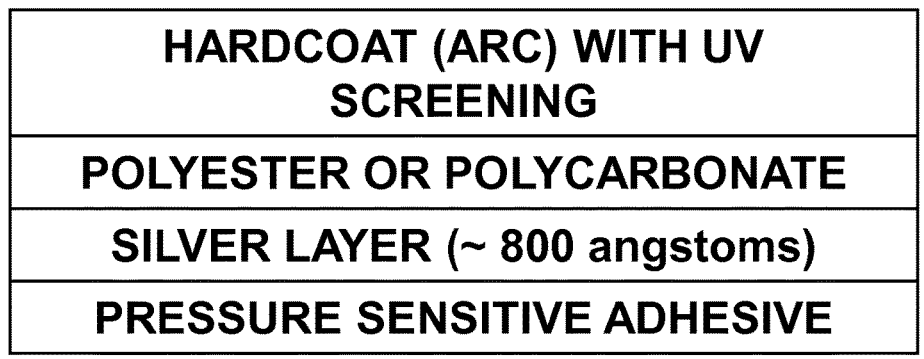
FIG. 11 provides a reflector construction of a solar reflector as described herein.

FIG. 11 provides an example reflector construction. A PET with UV-screening capabilities can be used, which adds UV stability. The topmost ARC/hardcoat layer is fundamentally important, however, since the polyester (even UV-stabilized PET) will still degrade with UV exposure.

We know that the ARC/hardcoat that has tested so well (20+ years in UAWS) adheres very well to the PMMA (acrylic) atop the Base Polymer Mirror Film, an important characteristic that assumes mechanical integrity in a rugged outdoor environment. For some applications, the ARC/hardcoat may not adhere as well to PC (polycarbonate) or polyester without surface treatment, like corona discharge. To increase the adherence of the hardcoat, we developed another construction, as provided in FIG. 12. As shown in FIG. 12, the thin layer of the $SiO_x$ or $Al_2O_3$ are nearly transparent to light over the wavelength of interest and have excellent UV stability and can provide stronger adhesion of the ARC/hardcoat.

Figure 13:
FIG. 13 provides a reflector construction of a solar reflector as described herein.

Alternatively, a thin layer of PMMA (also known to be highly transparent to in the wavelengths of interest, and to be stable under UV light) can be used as shown in FIG. 13. The thin PMMA layer has the additional virtue that it can be flow coated (a simple well known process) atop the PET using inexpensive methods.

Figure 14:
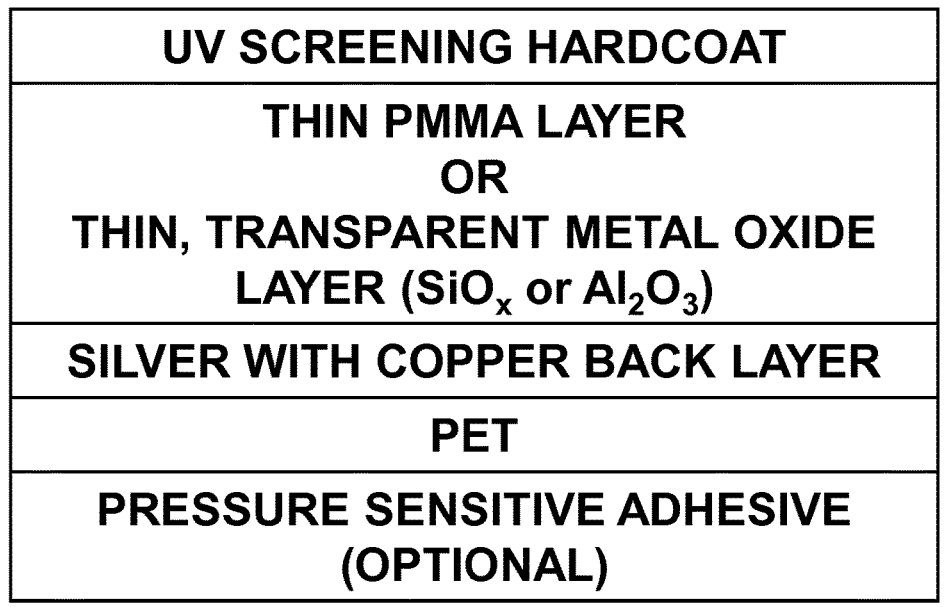
FIG. 14 provides a reflector construction of a solar reflector as described herein.

Another similar construction is provided in FIG. 14. In this construction, the reflective silver layer is above the PET film, which could increase reflectance since sunlight need not pass (twice) through the PET layer. The PSA is shown as optional because the PET can provide sufficient protection to the construction on the backside without the need for a PSA layer (which generally provides for protection as well as offering bondability of the construction to a substrate such as aluminum). This is an advantage for situations where the reflector is not intended to be bonded to a structural substrate, for example, where the reflector is used as a stretched membrane and supported for edges only.

Figure 15:
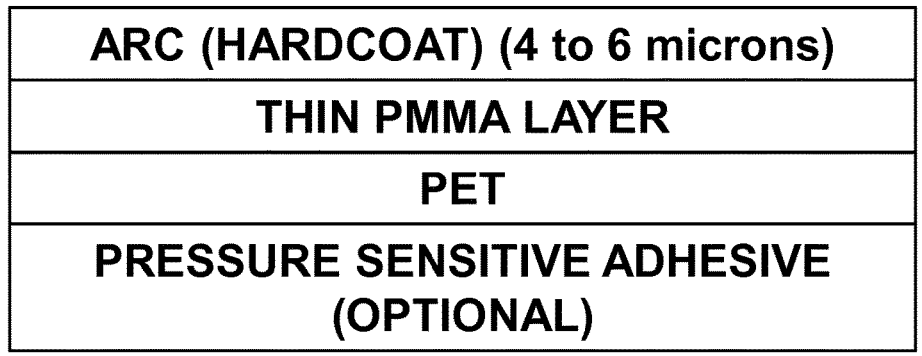
FIG. 15 provides a reflector construction of a solar reflector as described herein.

Finally, a non-reflective construction is provided in FIG. 15, a construction intended to be used as a highly weatherable and transparent protective overlay (e.g., to protect underlying materials from sunlight damage). This construction builds upon the knowledge that the Red Spot ARC/hardcoat adheres well to PMMA. A weatherable (20+ year) abrasion resistant overlay like this can have large commercial value, since this kind of product is not known to exist presently (particularly the long lifetime outdoors).

Figure 16:
FIG. 16 provides a reflector construction of a solar reflector as described herein.

One especially large market for this type of material/construction is the window film industry where a stack of film is adhered to glass windows. An example of this construction is provided in FIG. 16. The thin reflective layers (e.g. nickel, copper, aluminum) reduce the amount of light that passes through the construction to keep interior spaces (e.g. homes, cars, buildings) cooler in the summer and also protects interior furnishings from UV damage. Most window films are suited only for use on the inside/interior of windows because the stack of materials will not last outdoors. This construction has the virtue of placement on the outside of windows.

Figure 17:
FIG. 17 provides a reflector construction of a solar reflector as described herein.

An alternative construction for a solar reflector is provided in FIG. 17. In this figure, the reflective metal layer(s) are provided directly below the ARC (hardcoat) layer. This construction requires the use of advanced adhesion promoting technology, such as atomic layer deposition (ALD), to adhere the ARC directly to the reflective metal layer(s). In this construction, the reflective metal layers are silver over copper.

STATEMENTS REGARDING INCORPORATION BY REFERENCE AND VARIATIONS

Each reference cited herein is hereby incorporated by reference in its entirety. However, if any inconsistency arises between a cited reference and the present disclosure, the present disclosure takes precedent. Some references provided herein are incorporated by reference to provide details concerning the state of the art prior to the filing of this application, other references can be cited to provide additional or alternative device elements, additional or alternative materials, additional or alternative methods of analysis or applications of the invention. Patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, methods steps set forth in the present description. As will be obvious to one of skill in the art, methods and devices useful for the present methods can include a large number of optional composition and processing elements and steps.

One of ordinary skill in the art will appreciate that device elements, as well as materials, shapes and dimensions of device elements, as well as methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed can be resorted to by those skilled in the art, and that such modifications and variations are considered to be within the scope of this invention.

When a Markush group or other grouping is used herein, all individual members of the group and all combinations and possible subcombinations of the group are intended to be individually included in the disclosure. Every combination of components or materials described or exemplified herein can be used to practice the invention, unless otherwise stated. One of ordinary skill in the art will appreciate that methods, device elements, and materials other than those specifically exemplified can be employed in the practice of the invention without resort to undue experimentation. All art-known functional equivalents, of any such methods, device elements, and materials are intended to be included in this invention. Whenever a range is given in the specification, for example, a temperature range, a frequency range, a time range, or a composition range, all intermediate ranges and all subranges, as well as, all individual values included in the ranges given are intended to be included in the disclosure. Any one or more individual members of a range or group disclosed herein can be excluded from a claim of this invention. The invention illustratively described herein suitably can be practiced in the absence of any element or elements, limitation or limitations which is not specifically disclosed herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. The term "comprising" is intended to be broader than the terms "consisting essentially of" and "consisting of", however, the term "comprising" as used herein in its broadest sense is intended to encompass the narrower terms "consisting essentially of" and "consisting of", thus the term "comprising" can be replaced with "consisting essentially of" to exclude steps that do not materially affect the basic and novel characteristics of the claims and "comprising" can be replaced with "consisting of" to exclude not recited claim elements.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed can be resorted to by those skilled in the art, and that such modifications and variations are considered to be within the scope of this invention as defined by the appended claims.

Although the description herein contains many specifics, these should not be construed as limiting the scope of the invention, but as merely providing illustrations of some of the embodiments of the invention.

What is claimed is:

1. A solar reflector comprising:
   an abrasion-resistant coating;
   a reflective metal layer below the abrasion-resistant coating;
   an adhesive layer below the reflective metal layer; and
   a polymer film layer;
   wherein the polymer film layer is provided between the abrasion-resistant coating and the reflective metal layer, or wherein the polymer film layer is provided between the reflective metal layer and the adhesive layer; and
   wherein a hemispherical reflectance of the solar reflector is above 80% for wavelengths between 400 nm and 2200 nm.

2. The solar reflector of claim 1, wherein the reflective metal layer comprises silver or aluminum.

3. The solar reflector of claim 1 further comprising a protective layer directly below the reflective metal layer.

4. The solar reflector of claim 3, wherein the protective layer comprises copper, nickel, chrome, a metal alloy, a metal oxide, or any combination of these.

5. The solar reflector of claim 1, wherein the abrasion-resistant coating comprises an acrylate.

6. The solar reflector of claim 1, wherein the abrasion-resistant coating comprises ultraviolet absorbers.

7. The solar reflector of claim 1, wherein the abrasion-resistant coating prevents more than a one percent decrease in specular reflectance of the solar reflector when subjected to 30 cycles of abrasive exposure from a Taber wheel loaded at 250 grams.

8. The solar reflector of claim 1, wherein the abrasion-resistant coating absorbs less than an average of four percent of electromagnetic radiation incident to the solar reflector having wavelengths selected over the range of 400 nanometers to 2,500 nanometers.

9. The solar reflector of claim 1, wherein the abrasion-resistant coating has a thickness selected over the range of 1 micron to 25 microns.

10. The solar reflector of claim 1, wherein the abrasion-resistant coating is in physical contact with the polymer film layer.

11. The solar reflector of claim 6, wherein the abrasion-resistant coating protects the polymer film layer, reflective metal layer, and adhesive layer from damage caused by electromagnetic radiation incident to the solar reflector having wavelengths selected over the range of 280 nanometers to 400 nanometers.

12. The solar reflector of claim 6, wherein the abrasion-resistant coating transmits less than five percent of electromagnetic radiation incident to the solar reflector having wavelengths selected over the range of 250 nanometers to 350 nanometers.

13. The solar reflector of claim 6, wherein the abrasion-resistant coating transmits greater than 33 percent of electromagnetic radiation incident to the solar reflector having wavelengths selected over the range of 350 nanometers to 400 nanometers.

14. The solar reflector of claim 1, wherein the abrasion-resistant coating is the topmost layer of the solar reflector.

15. The solar reflector of claim 1, wherein the abrasion-resistant coating is provided by gravure, reverse-roll, gap-coating, Meyer rod, slot-die, immersion, curtain, and air-knife application technique.

16. The solar reflector of claim 1, wherein the adhesive layer comprises a pressure-sensitive adhesive.

17. The solar reflector of claim 1, wherein the adhesive layer is chemically inert with respect to the reflective metal layer and the protective layer.

18. The solar reflector of claim 1, wherein the polymer film layer comprises a polyester or polycarbonate.

19. The solar reflector of claim 1, wherein the polymer film layer comprises ultraviolet absorbers.

20. The solar reflector of claim 19, wherein the polymer film layer prevents transmission of at least 95 percent of electromagnetic radiation incident to the solar reflector having wavelengths selected over the range of 200 nanometers to 380 nanometers.

21. The solar reflector of claim 19, wherein the polymer film layer transmits at least 96 percent of electromagnetic radiation incident to the solar reflector having wavelengths selected over the range of 380 nanometers to 2500 nanometers.

22. The solar reflector of claim 1, wherein the polymer film layer has a thickness selected over the range of 10 microns to 150 microns.

23. The solar reflector of claim 1, wherein the reflective metal layer has a thickness of less than 0.15 micron.

24. The solar reflector of claim 3, wherein the protective layer has a thickness of less than 0.15 micron.

25. The solar reflector of claim 1, wherein the adhesive layer has a thickness selected over the range of 5 microns to 100 microns.

26. The solar reflector of claim 1, wherein a surface of the polymer film layer has been treated by an adhesion promotion technique; and wherein the adhesion promotion technique is a corona discharge, plasma, atomic layer deposition, or chemical etch adhesion promotion technique.

27. The solar reflector of claim 1, wherein the adhesive layer is provided on a substrate.

28. The solar reflector of claim 1 for use in a concentrating solar, solar tube, light shelf, laminated sheet, or lighting reflector application.

29. A solar reflector comprising:
an abrasion-resistant coating;
a polyester layer directly below the abrasion-resistant coating;
a silver layer directly below the polyester layer;
a copper layer directly below the silver layer; and
an adhesive layer below the silver layer;
wherein the abrasion-resistant coating has a thickness selected over the range of 1 to 25 microns;
wherein the copper layer has a thickness selected over the range of 0.002 micron to 0.15 micron;
wherein the polyester layer comprises polyethylene terephthalate (PET); and
wherein the silver layer has a thickness selected over the range of 0.05 micron to 0.15 micron; and
wherein a hemispherical reflectance of the solar reflector is above 80% for wavelengths between 400 nm and 2200 nm.

30. A solar reflector comprising:
an abrasion-resistant coating;
a silver layer directly below the abrasion-resistant coating;
a copper layer directly below the silver layer;
a polyester layer directly below the copper layer; and
an adhesive layer below the silver layer;
wherein the abrasion-resistant coating has a thickness selected over the range of 1 to 25 microns;
wherein the copper layer has a thickness selected over the range of 0.002 micron to 0.15 micron;
wherein the polyester layer comprises polyethylene terephthalate (PET); and
wherein the silver layer has a thickness selected over the range of 0.05 micron to 0.15 micron; and
wherein a hemispherical reflectance of the solar reflector is above 80% for wavelengths between 400 nm and 2200 nm.

31. The solar reflector of claim 1, wherein the solar reflector does not comprise an additional acrylic layer between the reflective metal layer and the abrasion-resistant coating.

32. A method of collecting solar radiation, the method comprising:
providing a solar reflector in optical communication with the sun;
providing a target in optical communication with the solar reflector; and
reflecting at least a portion of solar radiation incident on the solar reflector to the target;
wherein the solar reflector comprises:
an abrasion-resistant coating;
a reflective metal layer below the abrasion-resistant coating;
an adhesive layer below the reflective metal layer; and
a polymer film layer;
wherein the polymer film layer is provided between the abrasion-resistant coating and the reflective metal layer, or wherein the polymer film layer is provided between the reflective metal layer and the adhesive layer; and
wherein a hemispherical reflectance of the solar reflector is above 80% for wavelengths between 400 nm and 2200 nm.

33. A method of collecting solar radiation, the method comprising:
providing a solar reflector in optical communication with the sun;
providing a target in optical communication with the solar reflector; and
reflecting at least a portion of solar radiation incident on the solar reflector to the target;
wherein the solar reflector comprises:
an abrasion-resistant coating;
a polyester layer directly below the abrasion-resistant coating;
a silver layer directly below the polyester layer;
a copper layer directly below the silver layer; and
an adhesive layer below the silver layer;
wherein the abrasion-resistant coating has a thickness selected over the range of 1 to 25 microns;
wherein the copper layer has a thickness selected over the range of 0.002 micron to 0.15 micron;

wherein the polyester layer comprises polyethylene terephthalate (PET); and wherein the silver layer has a thickness selected over the range of 0.05 micron to 0.15 micron; and wherein a hemispherical reflectance of the solar reflector is above 80% for wavelengths between 400 nm and 2200 nm.

34. The solar reflector of claim 1, wherein the solar reflector does not comprise a PMMA layer below the abrasion-resistant coating.

35. The solar reflector of claim 1, wherein the abrasion-resistant coating comprises a material selected from the group consisting of titanium dioxide, ultraviolet cured acrylate, ultraviolet cured thermoset acrylate, plasma-enhanced chemical vapor deposited silicon oxynitride ($SiO_xN_y$), polyurethane, and polyaspartic.

* * * * *